United States Patent
Lazaridis et al.

(10) Patent No.: US 9,344,839 B2
(45) Date of Patent: May 17, 2016

(54) SYSTEM AND METHOD FOR PUSHING INFORMATION FROM A HOST SYSTEM TO A MOBILE COMMUNICATION DEVICE

(75) Inventors: Mihal Lazaridis, Waterloo (CA); Gary P. Mousseau, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 3457 days.

(21) Appl. No.: 10/207,418

(22) Filed: Jul. 29, 2002

(65) Prior Publication Data

US 2003/0005066 A1 Jan. 2, 2003

Related U.S. Application Data

(60) Continuation of application No. 09/528,495, filed on Mar. 17, 2000, now Pat. No. 6,463,464, which is a division of application No. 09/087,623, filed on May 29, 1998, now Pat. No. 6,219,694.

(51) Int. Cl.
*G06F 15/16* (2006.01)
*H04W 4/02* (2009.01)
(Continued)

(52) U.S. Cl.
CPC .............. *H04W 4/02* (2013.01); *G06Q 10/107* (2013.01); *G06Q 10/109* (2013.01); *H04L 29/06* (2013.01); *H04L 51/04* (2013.01); *H04L 51/14* (2013.01); *H04L 51/38* (2013.01); *H04L 63/0428* (2013.01); *H04L 67/04* (2013.01); *H04L 67/1095* (2013.01); *H04L 67/16* (2013.01); *H04L 67/18* (2013.01); *H04L 67/26* (2013.01); *H04L 67/2814* (2013.01); *H04L 67/327* (2013.01); *H04M 3/4872* (2013.01); *H04W 4/00* (2013.01); *H04W 4/12* (2013.01);
(Continued)

(58) Field of Classification Search
USPC .......................................................... 709/200
See application file for complete search history.

(56) References Cited

U.S. PATENT DOCUMENTS 4,106,060 A 8/1978 Chapman, Jr.
4,417,349 A 11/1983 Hills et al.
(Continued)

FOREIGN PATENT DOCUMENTS

AU 7843498 2/1999
DE 19961345 12/1999
(Continued)

OTHER PUBLICATIONS

News Release, "Motorola Announces Pagewriter 250, The World's Smallest Pager with Full Keyboard", Feb. 27, 1997 (2 pgs.).
(Continued)

*Primary Examiner* — Adnan Mirza
(74) *Attorney, Agent, or Firm* — Fish & Richardson P.C.

(57) ABSTRACT

A system and method for pushing information from a host system to a mobile data communication device upon sensing a triggering event is disclosed. A redirector program operating at the host system enables a user to continuously redirect certain user-selected data items from the host system to the user's mobile data communication device upon detecting that one or more user-defined triggering events has occurred. The redirector program operates in connection with event generating applications and repackaging systems at the host system to configure and detect a particular user-defined event, and then to repackage the user-selected data items in an electronic wrapper prior to pushing the data items to the mobile device.

27 Claims, 5 Drawing Sheets

(51) Int. Cl.

| | | |
|---|---|---|
| *G06Q 10/10* | (2012.01) | |
| *H04L 29/06* | (2006.01) | |
| *H04L 12/58* | (2006.01) | |
| *H04M 3/487* | (2006.01) | |
| *H04W 4/00* | (2009.01) | |
| *H04W 4/12* | (2009.01) | |
| *H04W 4/16* | (2009.01) | |
| *H04W 8/26* | (2009.01) | |
| *H04W 12/02* | (2009.01) | |
| *H04W 24/00* | (2009.01) | |
| *H04W 88/04* | (2009.01) | |
| *H04L 29/08* | (2006.01) | |
| *H04M 3/42* | (2006.01) | |
| *H04W 8/18* | (2009.01) | |
| *H04W 8/24* | (2009.01) | |
| *H04W 40/00* | (2009.01) | |
| *H04W 80/04* | (2009.01) | |

(52) U.S. Cl.
CPC ............... *H04W 4/16* (2013.01); *H04W 8/26* (2013.01); *H04W 12/02* (2013.01); *H04W 24/00* (2013.01); *H04W 88/04* (2013.01); *H04L 51/063* (2013.01); *H04L 51/066* (2013.01); *H04L 51/08* (2013.01); *H04L 51/28* (2013.01); *H04L 63/083* (2013.01); *H04L 67/02* (2013.01); *H04L 67/2819* (2013.01); *H04L 67/42* (2013.01); *H04L 69/329* (2013.01); *H04M 3/4211* (2013.01); *H04M 2203/353* (2013.01); *H04W 8/18* (2013.01); *H04W 8/245* (2013.01); *H04W 40/00* (2013.01); *H04W 80/04* (2013.01); *Y10S 707/99952* (2013.01)

(56) References Cited

U.S. PATENT DOCUMENTS

| | | | |
|---|---|---|---|
| 4,438,433 | A | 3/1984 | Smoot et al. |
| 4,558,454 | A | 12/1985 | Hills et al. |
| 4,644,351 | A | 2/1987 | Zabarsky et al. |
| 4,695,880 | A | 9/1987 | Johnson et al. |
| 4,697,281 | A | 9/1987 | O'Sullivan |
| 4,713,780 | A | 12/1987 | Schultz et al. |
| 4,763,291 | A | 8/1988 | Schwaber |
| 4,768,087 | A | 8/1988 | Taub et al. |
| 4,837,798 | A | 6/1989 | Cohen et al. |
| 4,837,800 | A | 6/1989 | Freeburg et al. |
| 4,845,658 | A | 7/1989 | Gifford |
| 4,856,047 | A | 8/1989 | Saunders |
| 4,928,096 | A | 5/1990 | Leonardo et al. |
| 4,935,954 | A | 6/1990 | Thompson et al. |
| 4,951,044 | A | 8/1990 | Nelson et al. |
| 4,972,457 | A | 11/1990 | O'Sullivan |
| 4,980,907 | A | 12/1990 | Raith et al. |
| 5,008,926 | A | 4/1991 | Misholi |
| 5,043,721 | A | 8/1991 | May |
| 5,058,431 | A | 10/1991 | Karwacki |
| 5,068,916 | A | 11/1991 | Harrison et al. |
| 5,086,502 | A | 2/1992 | Malcolm |
| 5,125,021 | A | 6/1992 | Lebowitz |
| 5,127,041 | A | 6/1992 | O'Sullivan |
| 5,128,981 | A | 7/1992 | Tsukamoto et al. |
| 5,136,291 | A | 8/1992 | Teague |
| 5,157,660 | A | 10/1992 | Kuwahara et al. |
| 5,159,592 | A | 10/1992 | Perkins |
| 5,177,680 | A | 1/1993 | Tsukino et al. |
| 5,181,200 | A | 1/1993 | Harrison |
| 5,210,785 | A | 5/1993 | Sato et al. |
| 5,265,033 | A | 11/1993 | Vajk et al. |
| 5,283,887 | A | 2/1994 | Zachery |
| 5,293,250 | A | 3/1994 | Okumura et al. |
| 5,299,255 | A | 3/1994 | Iwaki et al. |
| 5,307,059 | A | 4/1994 | Connary et al. |
| 5,313,582 | A | 5/1994 | Hendel et al. |
| 5,315,635 | A | 5/1994 | Kane et al. |
| 5,333,152 | A | 7/1994 | Wilber |
| 5,333,266 | A | 7/1994 | Boaz et al. |
| 5,370,566 | A | 12/1994 | Mitchell et al. |
| 5,392,390 | A | 2/1995 | Crozier |
| 5,406,557 | A | 4/1995 | Baudoin |
| 5,410,543 | A | 4/1995 | Seitz et al. |
| 5,416,473 | A | 5/1995 | Dulaney, III et al. |
| 5,416,842 | A | 5/1995 | Aziz |
| 5,436,960 | A | 7/1995 | Campana, Jr. et al. |
| 5,438,011 | A | 8/1995 | Blalock |
| 5,438,611 | A | 8/1995 | Campana, Jr. et al. |
| 5,452,356 | A | 9/1995 | Albert |
| 5,479,472 | A | 12/1995 | Campana, Jr. et al. |
| 5,487,100 | A | 1/1996 | Kane |
| 5,493,692 | A | 2/1996 | Theimer et al. |
| 5,495,484 | A | 2/1996 | Self et al. |
| 5,530,740 | A | 6/1996 | Irribarren et al. |
| 5,548,789 | A | 8/1996 | Nakanura |
| 5,557,569 | A | 9/1996 | Smayling et al. |
| 5,557,659 | A | 9/1996 | Hyde-Thomson |
| 5,559,800 | A | 9/1996 | Mousseau et al. |
| 5,572,528 | A | 11/1996 | Shuen |
| 5,577,202 | A | 11/1996 | Padgett |
| 5,579,472 | A | 11/1996 | Keyworth, II et al. |
| 5,588,009 | A | 12/1996 | Will |
| 5,598,536 | A | 1/1997 | Slaughter, III et al. |
| 5,603,054 | A | 2/1997 | Theimer et al. |
| 5,604,491 | A | 2/1997 | Coonley et al. |
| 5,604,788 | A | 2/1997 | Tett |
| 5,613,108 | A | 3/1997 | Morikawa |
| 5,625,670 | A | 4/1997 | Campana, Jr. et al. |
| 5,627,829 | A | 5/1997 | Gleeson et al. |
| 5,630,060 | A | 5/1997 | Tang et al. |
| 5,631,946 | A | 5/1997 | Campana, Jr. et al. |
| 5,633,810 | A | 5/1997 | Mandal et al. |
| 5,638,450 | A | 6/1997 | Robson |
| 5,641,946 | A | 6/1997 | Shim |
| 5,666,530 | A | 9/1997 | Clark et al. |
| 5,666,553 | A | 9/1997 | Crozier |
| 5,673,316 | A | 9/1997 | Auerbach et al. |
| 5,673,322 | A | 9/1997 | Pepe et al. |
| 5,675,733 | A | 10/1997 | Williams |
| 5,701,423 | A | 12/1997 | Crozier |
| 5,705,995 | A | 1/1998 | Laflin et al. |
| 5,706,211 | A | 1/1998 | Beletic et al. |
| 5,727,159 | A | 3/1998 | Kikinis |
| 5,727,202 | A | 3/1998 | Kucala |
| 5,729,735 | A | 3/1998 | Meyering |
| 5,732,074 | A | 3/1998 | Spaur et al. |
| 5,737,531 | A | 4/1998 | Ehley |
| 5,742,668 | A | 4/1998 | Pepe et al. |
| 5,742,905 | A | 4/1998 | Pepe et al. |
| 5,745,689 | A | 4/1998 | Yeager et al. |
| 5,748,619 | A | 5/1998 | Meier |
| 5,751,960 | A | 5/1998 | Matsunaga |
| 5,751,971 | A | 5/1998 | Dobbins et al. |
| 5,754,954 | A | 5/1998 | Cannon et al. |
| 5,757,901 | A | 5/1998 | Hiroshige |
| 5,758,088 | A | 5/1998 | Bezaire et al. |
| 5,758,150 | A | 5/1998 | Bell et al. |
| 5,758,354 | A | 5/1998 | Huang et al. |
| 5,761,416 | A | 6/1998 | Mandal et al. |
| 5,764,639 | A | 6/1998 | Staples et al. |
| 5,764,899 | A | 6/1998 | Eggleston |
| 5,765,170 | A | 6/1998 | Morikawa |
| 5,771,353 | A | 6/1998 | Eggleston et al. |
| 5,781,614 | A | 7/1998 | Brunson |
| 5,781,901 | A | 7/1998 | Kuzma |
| 5,790,790 | A | 8/1998 | Smith et al. |
| 5,790,974 | A | 8/1998 | Tognazzin |
| 5,796,806 | A | 8/1998 | Birckbichler |
| 5,812,671 | A | 9/1998 | Ross, Jr. |
| 5,812,773 | A | 9/1998 | Norin |
| 5,812,819 | A | 9/1998 | Rodwin et al. |
| 5,813,016 | A | 9/1998 | Sumimoto |
| 5,815,081 | A | 9/1998 | Motohashi |
| 5,819,172 | A | 10/1998 | Campana, Jr. et al. |

(56) References Cited

U.S. PATENT DOCUMENTS

| | | | |
|---|---|---|---|
| 5,819,284 A | 10/1998 | Farber et al. |
| 5,822,434 A | 10/1998 | Caronni et al. |
| 5,826,023 A | 10/1998 | Hall et al. |
| 5,826,062 A | 10/1998 | Fake, Jr. et al. |
| 5,831,664 A | 11/1998 | Wharton et al. |
| 5,838,252 A | 11/1998 | Kikinis |
| 5,838,926 A | 11/1998 | Yamagishi |
| 5,844,969 A | 12/1998 | Goldman et al. |
| 5,850,219 A | 12/1998 | Kumomura |
| 5,850,444 A | 12/1998 | Rune |
| 5,862,321 A | 1/1999 | Lamming et al. |
| 5,862,325 A | 1/1999 | Reed et al. |
| 5,867,660 A | 2/1999 | Schmidt et al. |
| 5,878,434 A | 3/1999 | Draper et al. |
| 5,881,235 A | 3/1999 | Mills |
| 5,884,033 A | 3/1999 | Duvall et al. |
| 5,889,845 A | 3/1999 | Staples et al. |
| 5,900,875 A | 5/1999 | Haitani et al. |
| 5,903,723 A | 5/1999 | Beck et al. |
| 5,905,777 A | 5/1999 | Foladare et al. |
| 5,913,040 A | 6/1999 | Rakavy et al. |
| 5,915,087 A | 6/1999 | Hammond et al. |
| 5,917,629 A | 6/1999 | Hortensius et al. |
| 5,928,329 A | 7/1999 | Clark et al. |
| 5,937,161 A | 8/1999 | Mulligan et al. |
| 5,941,954 A | 8/1999 | Kalajan |
| 5,941,956 A | 8/1999 | Shirakihara et al. |
| 5,943,426 A | 8/1999 | Frith et al. |
| 5,948,066 A | 9/1999 | Whalen et al. |
| 5,951,636 A | 9/1999 | Zerber |
| 5,953,322 A | 9/1999 | Kimball |
| 5,958,006 A | 9/1999 | Eggleston et al. |
| 5,959,621 A | 9/1999 | Nawaz et al. |
| 5,960,406 A | 9/1999 | Rasansky et al. |
| 5,961,590 A | 10/1999 | Mendez et al. |
| 5,964,833 A | 10/1999 | Kikinis |
| 5,966,663 A | 10/1999 | Gleason |
| 5,966,714 A | 10/1999 | Huang et al. |
| 5,968,131 A | 10/1999 | Mendez et al. |
| 5,969,636 A | 10/1999 | Parvulescu et al. |
| 5,973,612 A | 10/1999 | Deo et al. |
| 5,974,180 A | 10/1999 | Schwendeman |
| 5,974,238 A | 10/1999 | Chase, Jr. |
| 5,974,449 A | 10/1999 | Chang et al. |
| 5,978,689 A | 11/1999 | Tuoriniemi et al. |
| 5,978,837 A * | 11/1999 | Foladare et al. ............... 709/207 |
| 5,983,073 A | 11/1999 | Ditzik |
| 5,987,100 A | 11/1999 | Fortman et al. |
| 5,987,508 A | 11/1999 | Agraharam et al. |
| 5,995,597 A | 11/1999 | Woltz et al. |
| 6,000,000 A | 12/1999 | Hawkins et al. |
| 6,002,427 A | 12/1999 | Kipust |
| 6,002,769 A | 12/1999 | McGough |
| 6,006,274 A | 12/1999 | Hawkins et al. |
| 6,009,173 A | 12/1999 | Sumner |
| 6,009,455 A | 12/1999 | Doyle |
| 6,014,429 A | 1/2000 | LaPorta et al. |
| 6,016,478 A | 1/2000 | Zhang et al. |
| 6,018,762 A | 1/2000 | Brunson et al. |
| 6,018,782 A | 1/2000 | Hartmann |
| 6,023,000 A | 2/2000 | Fritz-Langhals et al. |
| 6,023,700 A | 2/2000 | Owens et al. |
| 6,023,708 A | 2/2000 | Mendez et al. |
| 6,034,621 A | 3/2000 | Kaufman |
| 6,035,104 A * | 3/2000 | Zahariev ...................... 709/203 |
| 6,044,205 A | 3/2000 | Reed et al. |
| 6,052,442 A | 4/2000 | Cooper et al. |
| 6,052,563 A | 4/2000 | Macko |
| 6,052,735 A | 4/2000 | Ulrich et al. |
| 6,058,431 A | 5/2000 | Srisuresh et al. |
| 6,067,561 A | 5/2000 | Dillon |
| 6,072,862 A | 6/2000 | Srinivasan |
| 6,073,137 A | 6/2000 | Brown et al. |
| 6,073,165 A | 6/2000 | Narasimhan et al. |
| 6,078,826 A | 6/2000 | Croft et al. |
| 6,078,921 A | 6/2000 | Kelly |
| 6,084,969 A | 7/2000 | Wright et al. |
| 6,085,192 A | 7/2000 | Mendez et al. |
| 6,085,231 A | 7/2000 | Agraharam et al. |
| 6,085,232 A | 7/2000 | Kikinis |
| 6,091,951 A | 7/2000 | Sturniolo et al. |
| 6,092,114 A | 7/2000 | Shaffer et al. |
| 6,092,191 A | 7/2000 | Shimbo et al. |
| 6,101,531 A | 8/2000 | Eggleston et al. |
| 6,112,244 A | 8/2000 | Moore et al. |
| 6,115,394 A | 9/2000 | Balachandran et al. |
| 6,115,736 A | 9/2000 | Devarakonda et al. |
| 6,115,754 A | 9/2000 | Landgren |
| 6,118,856 A | 9/2000 | Paarsmarkt et al. |
| 6,119,167 A | 9/2000 | Boyle et al. |
| 6,125,281 A | 9/2000 | Wells et al. |
| 6,125,369 A | 9/2000 | Wu et al. |
| 6,128,739 A | 10/2000 | Fleming, III |
| 6,130,892 A | 10/2000 | Short et al. |
| 6,131,096 A | 10/2000 | Ng et al. |
| 6,131,116 A | 10/2000 | Riggins et al. |
| 6,134,432 A | 10/2000 | Holmes et al. |
| 6,138,089 A | 10/2000 | Guberman |
| 6,138,146 A | 10/2000 | Moon et al. |
| 6,141,690 A | 10/2000 | Weiman |
| 6,144,671 A | 11/2000 | Perinpanathan et al. |
| 6,144,997 A | 11/2000 | Lamming et al. |
| 6,151,606 A | 11/2000 | Mendez |
| 6,154,839 A | 11/2000 | Arrow et al. |
| 6,157,318 A | 12/2000 | Minata |
| 6,157,630 A | 12/2000 | Adler et al. |
| 6,157,950 A | 12/2000 | Krishnan |
| 6,161,140 A | 12/2000 | Moriya |
| 6,163,274 A | 12/2000 | Lindgren |
| 6,167,379 A | 12/2000 | Dean et al. |
| 6,170,057 B1 | 1/2001 | Inoue et al. |
| 6,178,331 B1 | 1/2001 | Holmes et al. |
| 6,182,118 B1 | 1/2001 | Finney et al. |
| 6,185,551 B1 | 2/2001 | Birrell et al. |
| 6,185,603 B1 | 2/2001 | Henderson et al. |
| 6,195,533 B1 | 2/2001 | Tkatch et al. |
| 6,199,102 B1 | 3/2001 | Cobb |
| 6,202,085 B1 | 3/2001 | Benson et al. |
| 6,203,192 B1 | 3/2001 | Fortman |
| 6,205,448 B1 | 3/2001 | Kruglikov et al. |
| 6,208,996 B1 | 3/2001 | Ben-Shachar et al. |
| 6,219,694 B1 | 4/2001 | Lazaridis et al. |
| 6,222,942 B1 | 4/2001 | Martin |
| 6,233,341 B1 | 5/2001 | Riggins |
| 6,237,027 B1 | 5/2001 | Namekawa |
| 6,240,088 B1 | 5/2001 | Gayton et al. |
| 6,249,805 B1 | 6/2001 | Fleming |
| 6,249,820 B1 | 6/2001 | Dobbins et al. |
| 6,256,666 B1 | 7/2001 | Singhal |
| 6,263,201 B1 | 7/2001 | Hashimoto et al. |
| 6,272,545 B1 | 8/2001 | Flanagin et al. |
| 6,275,848 B1 | 8/2001 | Arnold |
| 6,275,850 B1 | 8/2001 | Beyda et al. |
| 6,289,105 B1 | 9/2001 | Murota |
| 6,289,212 B1 | 9/2001 | Stein et al. |
| 6,292,668 B1 | 9/2001 | Alanara et al. |
| 6,301,608 B1 | 10/2001 | Rochkind |
| 6,304,881 B1 | 10/2001 | Halim et al. |
| 6,311,282 B1 | 10/2001 | Nelson et al. |
| 6,313,734 B1 | 11/2001 | Weiss et al. |
| 6,314,108 B1 | 11/2001 | Ramasubramani et al. |
| 6,314,519 B1 | 11/2001 | Davis et al. |
| 6,324,544 B1 | 11/2001 | Alam et al. |
| 6,324,587 B1 | 11/2001 | Trenbeath et al. |
| 6,327,046 B1 | 12/2001 | Miyamoto |
| 6,330,244 B1 | 12/2001 | Swartz et al. |
| 6,332,156 B1 | 12/2001 | Cho et al. |
| 6,333,973 B1 | 12/2001 | Smith et al. |
| 6,356,937 B1 | 3/2002 | Montville et al. |
| 6,356,956 B1 | 3/2002 | Deo et al. |
| 6,360,210 B1 | 3/2002 | Wallman |
| 6,360,272 B1 | 3/2002 | Lincke et al. |
| 6,363,352 B1 | 3/2002 | Dailey et al. |
| 6,363,412 B1 | 3/2002 | Niwa et al. |

(56) References Cited

U.S. PATENT DOCUMENTS

| | | | |
|---|---|---|---|
| 6,370,566 B2 | 4/2002 | Discolo et al. | |
| 6,381,634 B1 | 4/2002 | Tello et al. | |
| 6,381,645 B1* | 4/2002 | Sassin | 709/227 |
| 6,389,455 B1 | 5/2002 | Fuisz | |
| 6,389,457 B2 | 5/2002 | Lazaridis et al. | |
| 6,393,463 B1 | 5/2002 | Fuchigami | |
| 6,400,958 B1 | 6/2002 | Isomursu et al. | |
| 6,401,112 B1 | 6/2002 | Boyer et al. | |
| 6,401,113 B2 | 6/2002 | Lazaridis et al. | |
| 6,421,707 B1* | 7/2002 | Miller et al. | 709/206 |
| 6,421,781 B1 | 7/2002 | Fox et al. | |
| 6,438,585 B2 | 8/2002 | Mousseau et al. | |
| 6,442,589 B1 | 8/2002 | Takahashi et al. | |
| 6,449,287 B1 | 9/2002 | Leuca et al. | |
| 6,463,463 B1 | 10/2002 | Godfrey et al. | |
| 6,463,464 B1 | 10/2002 | Lazaridis et al. | |
| 6,470,358 B1 | 10/2002 | Beyda et al. | |
| 6,487,560 B1 | 11/2002 | LaRue et al. | |
| 6,493,007 B1 | 12/2002 | Pang | |
| 6,505,055 B1 | 1/2003 | Kahn et al. | |
| 6,505,214 B1 | 1/2003 | Sherman et al. | |
| 6,546,263 B1 | 4/2003 | Petty et al. | |
| 6,580,787 B1 | 6/2003 | Akhteruzzaman | |
| 6,591,291 B1 | 7/2003 | Gabber et al. | |
| 6,611,358 B1 | 8/2003 | Narayanaswamy | |
| 6,697,458 B1 | 2/2004 | Kunjibettu | |
| 6,701,378 B1 | 3/2004 | Gilhuly et al. | |
| 6,763,202 B2 | 7/2004 | Maeda | |
| 6,779,022 B1 | 8/2004 | Horstmann et al. | |
| 6,781,962 B1 | 8/2004 | Williams et al. | |
| 6,983,308 B1 | 1/2006 | Oberhaus et al. | |
| 7,386,588 B2 | 6/2008 | Mousseau et al. | |
| 2001/0001552 A1 | 5/2001 | Vong et al. | |
| 2001/0013071 A1 | 8/2001 | Lazaridis et al. | |
| 2001/0015977 A1 | 8/2001 | Johansson | |
| 2001/0029531 A1 | 10/2001 | Ohta | |
| 2001/0040693 A1 | 11/2001 | Saito et al. | |
| 2001/0042093 A1 | 11/2001 | Shirai et al. | |
| 2001/0045885 A1 | 11/2001 | Tett | |
| 2001/0054072 A1 | 12/2001 | Discolo et al. | |
| 2002/0010748 A1 | 1/2002 | Kobayashi et al. | |
| 2002/0023213 A1 | 2/2002 | Walker et al. | |
| 2002/0039899 A1* | 4/2002 | Rossman | 455/426 |
| 2002/0059380 A1 | 5/2002 | Biliris et al. | |
| 2002/0065889 A1* | 5/2002 | Macor | 709/206 |
| 2002/0069220 A1* | 6/2002 | Tran | 707/503 |
| 2002/0099719 A1 | 7/2002 | Schwitters et al. | |
| 2002/0183044 A1 | 12/2002 | Blackwell et al. | |
| 2003/0097361 A1 | 5/2003 | Huang et al. | |
| 2004/0205106 A1 | 10/2004 | Adler et al. | |
| 2005/0114458 A1 | 5/2005 | Gottlieb | |
| 2009/0172079 A1 | 7/2009 | Eggleston et al. | |

FOREIGN PATENT DOCUMENTS

| | | |
|---|---|---|
| EP | 0617373 | 9/1994 |
| EP | 0736989 | 10/1996 |
| EP | 0772327 | 5/1997 |
| EP | 0777394 | 6/1997 |
| EP | 0788287 | 8/1997 |
| EP | 09214556 | 8/1997 |
| EP | 0793387 | 9/1997 |
| EP | 0825788 | 2/1998 |
| EP | 0838774 | 4/1998 |
| EP | 0838934 | 4/1998 |
| EP | 0772327 | 2/1999 |
| EP | 0918417 | 5/1999 |
| EP | 0930766 | 7/1999 |
| EP | 0986225 | 3/2000 |
| EP | 1 096 725 A2 | 5/2001 |
| JP | 06-232901 | 8/1994 |
| JP | 07-175603 | 7/1995 |
| JP | 2008298520 | 11/1996 |
| JP | 9214556 | 8/1997 |
| JP | 9305155 | 11/1997 |
| JP | 10-063590 | 3/1998 |
| JP | 11289346 | 10/1999 |
| JP | 2008288962 | 11/2008 |
| JP | 2009130424 | 6/2009 |
| JP | 2010074221 | 4/2010 |
| WO | 96/19064 | 6/1996 |
| WO | 9619064 | 6/1996 |
| WO | 9726709 | 7/1997 |
| WO | 9727717 | 7/1997 |
| WO | WO 97/28518 | 8/1997 |
| WO | 9732251 | 9/1997 |
| WO | 9733421 | 9/1997 |
| WO | 9735402 | 9/1997 |
| WO | WO 9733421 | 9/1997 |
| WO | 9741654 | 11/1997 |
| WO | 9744942 | 11/1997 |
| WO | WO 97/49251 | 12/1997 |
| WO | 9800787 | 1/1998 |
| WO | WO 9807897 | 1/1998 |
| WO | 9821911 | 5/1998 |
| WO | 9823108 | 5/1998 |
| WO | 9826344 | 6/1998 |
| WO | 9848560 | 10/1998 |
| WO | 9905620 | 2/1999 |
| WO | 9905813 | 2/1999 |
| WO | 9906900 | 2/1999 |
| WO | 9912365 | 3/1999 |
| WO | 9917505 | 4/1999 |
| WO | 9919988 | 4/1999 |
| WO | 9936870 | 7/1999 |
| WO | 9945484 | 9/1999 |
| WO | 9945684 | 9/1999 |
| WO | 9948312 | 9/1999 |
| WO | WO 9945684 | 9/1999 |
| WO | 9950974 | 10/1999 |
| WO | 9963709 | 12/1999 |
| WO | 0011567 | 3/2000 |
| WO | 0011832 | 3/2000 |
| WO | 0020994 | 4/2000 |
| WO | WO 00/31931 | 6/2000 |
| WO | WO 00/41359 | 7/2000 |
| WO | WO 00/49819 | 8/2000 |
| WO | WO 01/01264 | 1/2001 |
| WO | 0113572 | 2/2001 |
| WO | 0113656 | 2/2001 |
| WO | WO 01/22669 A1 | 3/2001 |
| WO | 0141472 | 6/2001 |
| WO | 0167716 | 9/2001 |
| WO | 0171539 | 9/2001 |

OTHER PUBLICATIONS

Press Release, "Motorola Announces New Solutions to Provide Consumers with Wireless Access to Personal and Enterprise E-mail Accounts," Mar. 21, 2001 (4 pgs.).

"Motorola's 'Macro' Wireless Communicator," http://www.msu.edu/-luckie/gallery/macro.htm, Jun. 14, 2001 (3 pgs.).

Press Release, "Apple Agrees to License Newton Technology to Schlumberger, Digital Ocean," Nov. 3, 1995 (3 pgs.).

Frezza, Bill, "PDA, PDA, Where Art Thou, PDA?", Freewire, Aug. 6, 2001 (5 pgs.).

"3Com PalmPilot Gets Wireless Link for E-Mail", Spooner, Jogn G., PC Week, Dec. 8, 1997.

Reiter, Alan A., "Focus on Technology," Telocator (Jan. 1990) (4 pgs.).

SAM Reference Manual, System for Automated Messages (Sep. 1989).

14th International Conference on Distributed Computing Systems, Poznan Poland, Jun. 21-24, 1994.

Takahashi, Y. et al.: "Communication Method with Data Compression and Encryption for Mobile Computing Environment," Proceedings of INET96, Montreal, Canada, Jun. 24-28, 1996, Transforming Our Society Now, 11 pages.

United States District Court, Northern District of California, San Francisco Division: *Good Technology, Inc.* v. *Research In Motion, Ltd., et al.*, Case No. C02-2348 MJJ, Plaintiff Good Technology,

(56) References Cited

OTHER PUBLICATIONS

Inc.'s Preliminary Invalidity Contentions Pursuant to Patent L.R. 3-3 and Response Under Patent L.R. 3-4, Jan. 16, 2004, 33 pages.
Perkins, C.: "RFC 2002—IP Mobility Support," IBM, Oct. 1996, 61 pages.
Johnson, D.: "Scalable Support for Transparent Mobile Host Internetworking," Wireless Networks, The Journal of Mobile Communication, Computation and Information, vol. 1, No. 3, Oct. 1995, pp. 311-321.
Dawson, F., et al.: "iCalendar Message-Based Interoperability Protocol (iMIP)," Standards Track, RFC 2447, iMIP, Nov. 1998, 4 pages, XP-002249002.
Nelson, M.: "Wireless Data Services: Here and Now," PDA Developers 2.6, Nov./Dec. 1994, 3 pages.
Feibus, "A Desktop in Your Palm", Informationweek, Aug. 25, 1997, pp. 65ff.
Behr, "Handheld Solutions", Informationweek, Oct. 27, 1997, pp. 106-113.
Moody's Investors Service, Socket Communications Inc.—History & Debt, Investex Report No. 3240276.
Newsletter, E-Mail Merges With Voice Through Infinite Technologies, Voice Technology & Services News, May 26, 1998.
Newsletter, Vodapage: Vodapage demos increasing convergence of pagers and mobile communications at TMA 29, M2 Presswire, Nov. 28, 1996.
Mosher, Microsoft Exchange User's Handbook, Duke Press, 1997, pp. 547-549.
DTS Wireless Website located at D.R.L. http://www.dtswireless.com.
"3Com PalmPilot Gets Wireless Link for E-Mail", Spooner, John G., PC Week, Dec. 8, 1997.
"Have Your Pager Call My Pager", Sullivan, Kristina B., PC Week, Dec. 8, 1997.
Briere, Daniel, et al., "One Mailbox, Just Like Old Times," Network World, vol. 14, issue 16, p. 21 (Apr. 21, 1997).
Padwick, et al., Special Edition Using Microsoft Outlook 97, 1997, Que Corporation, pp. 250-251, 353-367.
News Release, "Motorola Rings in 1995 with the Launch of the Marco® Wireless Communicator," Jan. 4, 1995 (4 pgs.).
Timeline, "FLEX™ Technology Timeline," (3 pgs.).
General Magic, Inc., Corporate Backgrounder, 2001 (2 pgs.).
Pegasus Email Settings, ABSnet Internet Services, Inc. (4 pgs.).
Motorola, Inc., emailVClient, 2001 (4 pages).
Dewey, Barney, "Communications Strategies for Newton 2.0," Newton Technology Journal, p. 10, Jun. 1996.
"Motorola's 'Marco' Wireless Communicator," http://www.msu.edu/-luckie/gallery/marco.htm, Jun. 14, 2001 (3 pgs.).
News Release, "CE Software Announces MobileVision," Editorial Contacts, CE Software, Inc., 1995 (3 pgs.).
News Release, "CE Software Ships MobileVision," Jun. 20, 1995 (3 pgs.).
Newton Reference, Communications, 1996-1997 (4 pgs.).
PC Pro Issue 31: Realworld Computing, PDA Column, Jul. 30, 1997 (7 pgs.).
Enterprise Solutions for Email Overload, Founder Publications, http://www.amikanow.com/corporate/publications.htm, Aug. 6, 2001 (9 pgs.).
"Motorola's 'Marco' Wireless Communicator," http://www.msu.edu/-luckie/gallery/marco.htm, Aug. 6, 2001 (2 pgs.).
Press Release, "Apple Agrees to License Newton Technology to Schlumberger, Digital Ocean," Nov. 3, 1995 (3 pgs.).
Frezza, Bill, "PDA, PDA, Wherefore Art Thou, PDA?", Freewire, Aug. 6, 2001 (6 pgs.).
Black, Lauren, et al., "Personal Digital Assistants," Macworld Reviews, Aug. 6, 2001 (5 pgs.).
Reference, "MobileVision Direct Wireless Connection to Your LAN-Based Electronic Mailbox," CE Software, Inc., pp. 1, 3, 5, 7, 9, 11, 13, 15, 17, 19, 21, 1995.
User Manual, "MobileVision Direct Wireless Connection to Your LAN-Based Electronic Mailbox," CE Software, Inc. 1995.
Johnson, David B., "Ubiquitous Mobile Host Internetworking," Fourth Workshop on Workstation Operating Systems, pp. 85-90, Oct. 14-15, 1993.
Johnson, David B., "Mobile Host Internetworking Using IP Loose Source Routing," School of Computer Science, Carnegie Mellon University, pp. 1-14 Feb. 1993.
Schoettle, Bob, "IP-Address Management on LANs," Byte, pp. 199-200, Feb. 1996.
Cheshire, Stuart, et al., "Internet Mobility 4×4," Computer Science Department, Stanford University, pp. 1-12, Aug. 1996.
Yeom, Hoen Y., et al., "IP Multiplexing by Transparent Port-Address Translator," Proceedings of the Tenth USENIX System Administration Conference, pp. 113-122, Sep. 29-Oct. 4, 1996.
Johnson, David B., "Scalable and Robust Internetwork Routing for Mobile Hosts," IEEE Computer Society, pp. 2-11, 1994.
Egevang, K. et al., "The IP Network Address Translator," Network Working Group, pp. 1-10, May 1994.
Manual, "Server and BBS Software for the Packet Radio" by Jean Paul Roubelat, pp. 1-173.
Book, "Internetwork Mobility The CDPD Approach," by Mark S. Taylor, William Waung, and Mohsen Banan, Jun. 11, 1996.
"BlackBerry Technical White Paper," Research In Motion Ltd., Version 1.0, 1998-1999.
Newsletter, "Battery Friendly Bulletin," vol. 1, Issue 3, pp. 1-7 and unnumbered page, 1999.
Article, Comerford, "Handhelds Duke It Out for the Internet," Wireless Internet, pp. 35-38 and 41, Aug. 2000.
Press Detail, "Extended Systems and Motorola Bring Short-Range Wireless to the Paging E-volution," Jan. 13, 2000 (3 pgs.).
Press Detail, "3Com Corporation Licenses Bluetooth Technology from Extended Systems," Feb. 22, 2000 (2 pgs.).
Web site Article, Hawaleshka, "The Web in Your Pocket," Maclean's, May 15, 2000 (3 pgs.).
Claxton, "Messaging API's for Voice Networks," Telecommunications, pp. 116-120, 1998.
Gifford, David K., et al., "The Application of Digital Broadcast Communication to Large Scale Information Systems," IEEE Journal on Selected Areas in Communications, vol. SAC-3, No. 3, pp. 457-467 (May 1985).
Gifford, David K., et al., "An Architecture for Large Scale Information Systems," ACM, pp. 161-170 (1985).
Arnum, Eric, "The Universal Mailbox Arrives . . . Sort of," Business Communications Review, pp. 49-52 (May 1996).
"Wireless E-Mail Services Gain Windows Clients," Kramer, Matt, PC Week, Apr. 17, 1995.
Perkins, C. et al., "IMHP: A Mobile Host Protocol for the Internet," Computer Networks and ISDN Systems 27 (1994), pp. 479-491.
Inouye, Jon et al., "System Support for Mobile Multimedia Applications," Proceedings of the IEEE $7^{th}$ International Workshop on Network and Operating System Support for Digital Audio and Video, May 19-21, 1997, pp. 135-146.
Xu, Kevin Houzhi, "Reliable Stream Transmission Protocols in Mobile Computing Environments," Bell Labs Technical Journal, Summer 1997, pp. 152-163.
Lavana, Hemang et al.., "Internet-Based Workflows: A Paradigm for Dynamically Reconfigurable Desktop Environments," Conference on Supporting Group Work, Proceedings of the International ACM SIGGROUP Conference on Supporting Group Work: The Integration Challenge, Nov. 16-19, 1997, pp. 204-213.
Perkins, Charles E. et al., "Mobility Support in IPv6," International Conference on Mobile Computing and Networking, Proceedings of the Second Annual International Conference on Mobile Computing and Networking, Nov. 11-12, 1996, pp. 27-37.
Goldszmidt, German et al., "*ShockAbsorber*: A TCP Connection Router," Globecom 97, IEEE Global Telecommunications Conference, Nov. 3-8, 1997, pp. 1919-1923.
IBM Portable Terminal User's Guide, Third Edition (Jun. 1985).
Binder, Richard et al, The Alohanet Menehune, University of Hawaii, Version 11 (Sep. 1974).
Computer Structures—Principles and Examples, McGraw Hill (1982).
Krebs, Jay, Portable Computer and Host Talk Over Radio-Frequency Link, Electronic, pp. 142-145 (Aug. 25, 1983).

(56) References Cited

OTHER PUBLICATIONS

Gadol, Steve, et al. "Nomadic Tenets—A User's Perspective," Sun Microsystems Laboratories, Inc., pp. 1-16 (Jun. 1994).
Declaration of David A. Keeney regarding SAM System, pp. 1-33 (Sep. 3, 2002).
"SAM™ integrates E-mail, Alpha Paging, Fax, and more!", SAM System for Automated Messages (10 pgs.).
SAMpage Manual, version 2.0, TeckNow! (Feb. 1990).
Kuehn, Carl, "More than EMail," Southwest Computer & Business Equipment Review, vol. VII, No. 2, (Feb. 1990) (1 pg.).
SAM System for Automated Messages User's Manual (1988) (17 pgs.).
Motorola Operating Instructions for Your "PMR 2000" Series Display Radio Pagers Personal Message Center (2000) (7 pgs.).
Motorola PMR 2000 Personal Message Receiver POCSAG (CCIR Radio Paging Code #1) (1986) (6 pgs.).
Undated, Information Display Pager D40, NEC Corporation (6 pgs.).
"Vendor-Independent Messaging Interface Functional Specification"; Version 1.00; Copyright (c) 1991, 1992 by Apple Computer, Inc., Borland International, Inc., Lotus Development Corporation, and Novell, Inc.; 183 pages.
Motorola, "Air*Mobile*™ Wireless Comm Guide for cc:Mail" User Guide Version 1.0, Motorola Wireless Data Group, 1995, pp. 3-48.
Motorola, "Air*Mobile*™ Wireless Comm Server for cc:Mail" User Guide Version 1.1, Motorola Wireless Data Group, 1995, pp. 4-46.
Sun Microsystems, JavaMail API Design Specification, Version 1.0, Dec. 9, 1997, Sun Microsystems, Inc., chapters 1-10 appendices A-E.
Compaq, Aero 2100 Series Color Palm-size PC Reference Guide, Second Edition, Aug. 1999, Compaq Corporation.
Cc:Mail NewsRoom, "Where Rubber Meets the Road," Jul. 29, 2004 pp. 1-15.
Dunker, "CE Software Announces MobileVision," CE Software, Inc., Jan. 4, 1995, 2 pgs.
Gadol et al, "Nomadic Tenets—A User's Perspective," Sun Microsystems Laboratories, Inc., Jun. 1994, 16 pgs.
US Office Action, U.S. Appl. No. 09/783,726, USPTO, May 2, 2002, 4 pgs.
US Office Action, U.S. Appl. No. 09/783,726, USPTO, Sep. 25, 2002, 26 pgs.
US Office Action, U.S. Appl. No. 09/783,726, USPTO, Apr. 16, 2003, 19 pgs.
US Office Action, U.S. Appl. No. 09/783,726, USPTO, Aug. 10, 2004, 24 pgs.
Japanese Office Action, Application No. 2004-297007, Japanese IPO, Feb. 24, 2009, 5 pages.
Japanese Office Action, Application No. 2004-297007, Japanese IPO, Jul. 12, 2010, 4 pages.
Japanese Office Action, Application No. 2004-297007, Japanese IPO, Nov. 30, 2009, 4 pages.
Japanese Office Action, Application No. 2004-297007, Japanese IPO, Dec. 3, 2010, 6 pgs.
US Office Action, U.S. Appl. No. 09/783,726, USPTO, Mar. 28, 2006, 20 pgs.
US Office Action, U.S. Appl. No. 09/783,726, USPTO, Oct. 13, 2006, 16 pgs.
US Office Action, U.S. Appl. No. 09/783,726, USPTO, Jul. 17, 2008, 11 pgs.
US Office Action, U.S. Appl. No. 09/783,726, USPTO, Apr. 29, 2009, 17 pgs.
Carthy et al, "MAPI Developers Forum post 'MAPI Notification,'" Apr. 12, 1996, 2 pgs.
Aldrich et al, MAPI Developers Forum post "Notification when posting a message to Exchange," May 13, 1997, 2 pgs.
Alikoski et al, "Google Groups post 'IMAPIAdviseSink object?,'" Jan. 19, 1996, 8 pgs.
Japanese Office Action, Application No. 2008-130152, Japanese IPO, Jul. 9, 2010, 3 pgs.
USPTO, Office Action, U.S. Appl. No. 09/783,726, Mar. 16, 2011, 22 pgs.

EPO, Communication pursuant to Article 94(3) EPC, Application No. 03003769.1, Dec. 21, 2010, 5 pgs.
JP IPO, Notice of Final Rejection, Application No. 2008-130152, Jul. 9, 2010, 3 pgs.
BPAI USPTO, Decision—Motions—Bd. R. 125(b), Doc. 342, *Lazaridis* v. *Eggleston*, Interference No. 105,700, dated May 2, 2011, 21 pgs.
BPAI USPTO, Judgment—Merits—Bd. R. 127, Doc. 343, *Lazaridis* v. *Eggleston*, Interference No. 105,700, dated May 2, 2011, 3 pgs.
BPAI USPTO, Eggleston's Motion 1 (Anticipation and Obviousness), Doc. 31, *Lazaridis* v. *Eggleston*, Interference No. 105,700, filed Nov. 12, 2009, 124 pgs.
BPAI USPTO, Lazaridis Substantive Motion 1 (For Lack of Written Description), Doc. 36, *Lazaridis* v. *Eggleston*, Interference No. 105,700, filed Nov. 12, 2009, 32 pgs.
BPAI USPTO, Lazaridis Substantive Motion 2 (for Judgment Based on Unpatentability Under 35 U.S.C. 112, Par. 2), Doc. 37, *Lazaridis* v. *Eggleston*, Interference No. 105,700, filed Nov. 12, 2009, 59 pgs.
BPAI USPTO, Lazaridis Substantive Motion 3 (for Judgement Based on Unpatentability Under 35 U.S.C. 102 and 103), Doc. 38, *Lazaridis* v. *Eggleston*, Interference No. 105,700, filed Nov. 12, 2009, 43 pgs.
BPAI USPTO, Lazaridis Substantive Motion 4 (To Undesignate Claims as Corresponding to the Count), Doc. 39, *Lazaridis* v. *Eggleston*, Interference No. 105,700, filed Nov. 12, 2009, 24 pgs.
BPAI USPTO, Eggleston's Opposition 1, Doc. 68, *Lazaridis* v. *Eggleston*, Interference No. 105,700, filed Feb. 26, 2010, 59 pgs.
BPAI USPTO, Eggleston's Opposition 2, Doc. 69, *Lazaridis* v. *Eggleston*, Interference No. 105,700, filed Feb. 26, 2010, 63 pgs.
BPAI USPTO, Eggleston's Opposition 3, Doc. 70, *Lazaridis* v. *Eggleston*, Interference No. 105,700, filed Feb. 26, 2010, 78 pgs.
BPAI USPTO, Eggleston's Opposition 4, Doc. 71, *Lazaridis* v. *Eggleston*, Interference No. 105,700, filed Feb. 26, 2010, 54 pgs.
BPAI USPTO, Lazardis Opposition 1, Doc. 73, *Lazaridis* v. *Eggleston*, Interference No. 105,700, filed Feb. 26, 2010, 189 pgs.
BPAI USPTO, Lazardis Opposition 2, Doc. 74, *Lazaridis* v. *Eggleston*, Interference No. 105,700, filed Feb. 26, 2010, 93 pgs.
BPAI USPTO, Declaration of Dr. Gary S. Tjaden, Doc. 192, *Lazaridis* v. *Eggleston*, Interference No. 105,700, filed Jun. 7, 2010, 62 pgs.
BPAI USPTO, First Declaration of John Friend, Doc. 170, *Lazaridis* v. *Eggleston*, Interference No. 105,700, filed Jun. 7, 2010, 175 pgs.
BPAI USPTO, Substitute Second Declaration of John Friend, Doc. 209, *Lazaridis* v. *Eggleston*, Interference No. 105,700, filed Jun. 7, 2010, 13 pgs.
BPAI USPTO, Third Declaration of John Friend, Doc. 286, *Lazaridis* v. *Eggleston*, Interference No. 105,700, filed Jun. 7, 2010, 62 pgs.
BPAI USPTO, Fourth Declaration of John Friend, Doc. 323, *Lazaridis* v. *Eggleston*, Interference No. 105,700, filed Jun. 7, 2010, 60 pgs.
BPAI USPTO, Substitute Declaration of Andrew M. Seybold, Doc. 196, *Lazaridis* v. *Eggleston*, Interference No. 105,700, filed Jun. 7, 2010, 6 pgs.
BPAI USPTO, Declaration of Brad Karp, Doc. 274, *Lazaridis* v. *Eggleston*, Interference No. 105,700, filed Jun. 7, 2010, 40 pgs.
BPAI USPTO, Second Declaration of Brad Karp, Doc. 306, *Lazaridis* v. *Eggleston*, Interference No. 105,700, filed Jun. 7, 2010, 20 pgs.
US District Court for the Eastern District of Texas, Research In Motion's Claim Construction Brief Regarding the RIM Patents, *Visto Corporation* v. *Research in Motion Limited*, Case No. 2:06-cv-00181-TJW-CE, filed Sep. 17, 2007, 32 pgs.
US District Court for the Eastern District of Texas, Memorandum Opinion and Order, *Visto Corporation* v. *Research In Motion Limited*, Case No. 2:06-cv-00181-TJW-CE, dated Apr. 30, 2008, 39 pgs.
US District Court for the Eastern District of Texas, Excerpts of Research In Motion Limited's and Research in Motion Corporation's Third Amended Answer, Defenses and Counterclaims, *Visto Corporation* v. *Research in Motion Limited*, Case No. 2:06.cv.00181.TJW.CE, filed Jun. 25, 2008, 6 pgs.
USPTO, Request for Ex Parte Reexamination of U.S. Pat. No. 6,219,694, U.S. Appl. No. 90/010,285, Sep. 18, 2008, 74 pgs.
USPTO, Litigation Search Report CRU 3999 [for U.S. Pat. No. 6,219,694], U.S. Appl. No. 90/010,285, Oct. 9, 2008, 93 pgs.

(56) References Cited

OTHER PUBLICATIONS

USPTO, Order Denying Request for Ex Parte Reexamination [of U.S. Pat. No. 6,219,694], U.S. Appl. No. 90/010,285, Dec. 16, 2008, 13 pgs.
USPTO, Replacement Request for Ex Parte Reexamination of U.S. Pat. No. 6,389,457, U.S. Appl. No. 90/010,286, Sep. 25, 2008, 35 pgs.
USPTO, Order Denying Request for Ex Parte Reexamination [of U.S. Pat. No. 6,389,457], U.S. Appl. No. 90/010,286, Dec. 16, 2008, 12 pgs.
Iellimo, Albert, PDAs the Next Generation, Network World Fusion—Press Room, Mar. 13, 1995, 8 pgs.
O'Brien, Jim, Evaluation: Ericsson GE's Co.'s Viking Express Includes Cellular Modern, Palmtop Computer, Communications Software, Electronic Mail Service, Hardware Review Online, Dec. 1992, 4 pgs., ZDNet.
O'Malley, Chris, Simonizing the PDA, BYTE.com, Dec. 1994, 9 pgs., CMP Media LLC, USA.
Radio Mail Ships Wireless E-mail Software: Product Announcement: Brief Article, LAN Magazine, No. 4, vol. 10, Apr. 1, 1995, p. 162, Information Access Company, USA.
RIM, Information About BlackBerry Wireless Email to Plan for Disaster Recovery, BlackBerry Technical Advisory No. STAE-0002, Aug. 8, 2000, 4 pgs., Research In Motion Limited.
Sbihli, Scott, The Envoy 150: Wireless from the Start, PDA Developers 4.6, Nov.-Dec. 1996.
Canadian Federal Court, Statement of Defence and Counterclaim by Defendant Visto Corporation, *Research In Motion Ltd. v. Visto Corporation*, Case No. T-1105-06, Nov. 15, 2006, 31 pgs.
Canadian Federal Court, Pinpoint Citations in Satisfaction of the Order of Madam Prothonotary Tabib Dated Dec. 19, 2006, *Research In Motion Ltd. v. Visto Corporation*, Case No. T-1105-06, Jan. 31, 2007, 31 pgs.
European High Court of Justice, Chancery Division, Patents Court, Statement of Defence and Counterclaim, Particulars of Infringement, and Grounds of Invalidity, *Research In Motion UK Limited v. Visto Corporation*, Case No. HC-06-CO4227, Feb. 2, 2007, 77 pgs.
European High Court of Justice, Chancery Division, Patents Court, Witness Statement of Jeanie Treichel, *Research In Motion UK Limited v. Visto Corporation*, Case No. HC-06-CO4227, Dec. 29, 2007, 4 pgs.
EPO Opposition Division, Opposition to EP 1096727 of Research in Motion UK Limited by Visto Corporation, *Research in Motion Limited v. Visto Corporation*, Opposition re EP 1096727, Dec. 21, 2006, 39 pgs.
EPO Opposition Division, Reply to Opposition, *Research in Motion Limited v. Visto Corporation*, Opposition re EP 1096727, Aug. 8, 2007, 32 pgs.
EPO Opposition Division, Opposition Letter by Visto Corporation, *Research in Motion Limited v. Visto Corporation*, Opposition re EP 1096727, Jan. 12, 2009, 3 pgs.
EPO Opposition Division, Decision Rejecting the Opposition (Art. 101(2) EPC), *Research in Motion Limited v. Visto Corporation*, Opposition re EP 1096727, May 14, 2009, 10 pgs.
EPO Opposition Division, Minutes of the Oral Proceedings Before the Opposition Division, *Research in Motion Limited v. Visto Corporation*, Opposition re EP 1096727, May 14, 2009, 6 pgs.
USPTO, Office Action, U.S. Appl. No. 09/783,726, Aug. 23, 2011, 11 pgs.
USPTO, Office Action, U.S. Appl. No. 09/783,726, Nov. 9, 2011, 11 pgs.
Allman, Eric, Sendmail—An Internetwork Mail Router, Jul. 29, 1991, 13 pgs.
Bixby, Mark, Announce: Aliaserv v1.0, Self-serve E-mail Aliases, Google Groups Discussion: comp.mail.misc, Mar. 24, 1994, 3 pgs., available at http://groups.google.com/group/comp.mail.misc/browse_thread/thread/d391285c06284025/432b 1f764674 7 431.
Burch et al., Motorola Envoy Press Clippings, Google Groups Discussion: comp.sys.pen, Mar. 7-17, 1994, 10 pgs., available at http://groups.google.com/group/comp.sys.pen/browse_threadlthread/21e7f8890df6d647/a09454f4a3673101.
Crocker, David, Standard for the Format of ARPA Internet Text Messages, RFC 822, Aug. 13, 1982, 50 pgs., Dep't of Elec. Eng'g, Univ. of Delaware, Newark, DE, USA.
Diehl et al., Need to Rewrite from Field on Outgoing Mail, Google Groups Discussion: comp.mail.sendmail, May 23-24, 1996, 2 pgs., Sendmail, Inc., USA, available at http://groups.google.com/group/comp.mail.sendmailibrowse_frm/thread/d9d6f674d 19d98fc/ 3115b57 49202f8f7.
Dilworth et al., Wireless as an Internet On-Ramp & Local Loop By-Pass, COOK Report on Internet Protocol, Technology, Economics, Policy, accessed Dec. 12, 2006, 45 pgs.
Funk, Andrew, A Personal Packet Radio Mailbox Using Roserver: Automated Packet Radio for Individuals, 8th ARRL Amateur Radio Computer Networking Conference, Oct. 7, 1989, 18 pgs., USA.
Garbee, Bdale, New Release of KA9Q Internet Package, Sep. 12, 1987, 5 pgs.
Irukayama, Godo, Actual Mobile Computing; Becoming an Expert of Wireless Electronic Mail, Nikkei Communications, No. 246, pp. 140-145, May 19, 1997, Kikkei BP Co., Japan.
Knowles, Brad, Frequently Asked Questions, Google Groups Discussion: comp.mail.sendmail, Mar. 24, 1997, 47 pgs., Sendmail, Inc., USA.
Levitt, Jason, Moving Mail with No Strings Attached: Users Love Wireless Electronicmail's Convenience, Jan. 24, 1994, 4 pgs., Information Access Company, USA.
Long, Geoff, The PAN Mongolia Experience, Dec. 6, 1996, 3 pgs., International Development Research Centre, Canada.
Reich, Richard, Sendmail V8: A (Smoother) Engine Powers Network Email, Network Computing, accessed Nov. 12, 2006, 16 pgs.
Smith et al., Integration of Wireless Technology in the Defense Information System Network (DISN), Milcom 96 Conference Proceedings, Oct. 21, 1996, pp. 389-393, ISBN 0-7803-3682-8/96, IEEE Communications Society.
Strom, David, Mobile Computing Comes of Age, Network World, Dec. 24, 2008, 4 pgs., available at http://www.strom.com/pubworkInw95.html.
Tanenbaum, Andrew, Network Layer: Mobile IP, Computer Networks, Jun. 9, 1997, Section 5.5.8, 3rd ed., Prentice-Hall PTR, USA.
Visto Corporation Launch Tour Presentation, Oct. 1997, 18 pgs., USA.
Wada et al., Mobile Computing Environment Based on Internet Packet Forwarding, USENIX, Jan. 25-29, 1993, pp. 503-517, USA.
Wireless Packet Network Helps Red Cross Keep Communicating: IBM's 9075 PCRadio, Communications News, Apr. 1993, 3 pgs., Nelson Publishing.
Woods et al., Alias Updates, Google Groups Discussion: comp.mail.sendmail, Apr. 24-27, 1990, 4 pgs., Sendmail, Inc., USA, available at http://groups.google.com/group/comp.mail.sendmail/browse_thread/thread/2a29648e0774e686/5213a85ce6d69c45.
Wynd Corporation, WyndMail for Windows CE Archived Information, Feb. 9, 1997, 8 pgs., WyndCommunications, USA, available at http://web.archive.org/web/19970209082529/www.wynd.com/ce/cefaq.html.
USPTO, Office Action, U.S. Appl. No. 11/849,785, Oct. 20, 2009, 9pgs.
USPTO, Office Action, U.S. Appl. No. 11/849,785, Mar. 26, 2010, 9pgs.
USPTO, Office Action, U.S. Appl. No. 11/849,785, Jun. 24, 2010, 9pgs.
USPTO, Office Action, U.S. Appl. No. 11/849,785, Dec. 16, 2010, 9 pgs.
USPTO, Office Action, U.S. Appl. No. 11/849,785, Jan. 25, 2011, 9 pgs.
USPTO, Notice of Allowance, U.S. Appl. No. 11/849,785, Jun. 16, 2011, 7 pgs.
USPTO, Office Action, U.S. Appl. No. 11/925,754, Feb. 4, 2011, 11 pgs.
USPTO, Notice of Allowance, U.S. Appl. No. 11/925,754, Aug. 17, 2011, 7 pgs.
USPTO, Office Action, U.S. Appl. No. 11/925,756, Aug. 9, 2010, 9 pgs.
USPTO, Office Action, U.S. Appl. No. 11/925,770, Sep. 1, 2010, 8 pgs.

(56) References Cited

OTHER PUBLICATIONS

USPTO, Office Action, U.S. Appl. No. 11/925,770, Feb. 23, 2011, 10 pgs.
USPTO, Office Action, U.S. Appl. No. 11/925,775, Aug. 20, 2010, 7 pgs.
USPTO, Office Action, U.S. Appl. No. 11/925,780, Jul. 8, 2010, 12 pgs.
USPTO, Office Action, U.S. Appl. No. 11/925,786, Jul. 23, 2010, 11 pgs.
USPTO, Office Action, U.S. Appl. No. 11/925,791, Aug. 20, 2010, 9 pgs.
USPTO, Office Action, U.S. Appl. No. 11/925,813, Oct. 2, 2009, 10 pgs.
USPTO, Notice of Allowance, U.S. Appl. No. 11/925,813, Apr. 6, 2010, 4 pgs.
USPTO, Office Action, U.S. Appl. No. 11/925,818, Dec. 30, 2009, 9 pgs.
USPTO, Office Action, U.S. Appl. No. 11/925,818, Jun. 30, 2010, 11 pgs.
USPTO, Office Action, U.S. Appl. No. 11/925,846, Jan. 6, 2010, 8 pgs.
USPTO, Office Action, U.S. Appl. No. 11/925,846, Aug. 12, 2010, 14 pgs.
USPTO, Office Action, U.S. Appl. No. 11/926,283, Jan. 4, 2009, 8 pgs.
USPTO, Office Action, U.S. Appl. No. 11/926,283, Jul. 8, 2010, 11 pgs.
USPTO, Office Action, U.S. Appl. No. 11/926,283, Sep. 16, 2010, 10 pgs.
USPTO, Office Action, U.S. Appl. No. 11/926,283, Mar. 2, 2011, 11 pgs.
USPTO, Notice of Allowance, U.S. Appl. No. 11/926,330, Jun. 14, 2010, 8 pgs.
USPTO, Office Action, U.S. Appl. No. 11/926,355, Aug. 19, 2010, 6 pgs.
USPTO, Office Action, U.S. Appl. No. 11/926,370, Aug. 19, 2010, 11 pgs.
United States District Court Southern District of New York, Complaint, Document 1, *Mahmood v. Research in Motion Ltd.*, Case 1:11-cv-05345-KBF, Filed Aug. 1, 2011, 432 Pgs.
United States District Court Southern District of New York, Motion to Dismiss, Document 12, *Mahmood v. Research in Motion Ltd.*, Case 1:11-cv-05345-KBF, Filed Aug. 22, 2011, 29 Pgs.
United States District Court Southern District of New York, Opposition to Motion to Dismiss, Document 14, *Mahmood v. Research in Motion Ltd.*, Case 1:11-cv-05345-KBF, Filed Nov. 6, 2011, 32 Pgs.
United States District Court Southern District of New York, Reply Memorandum in Support of Motion to Dismiss, Document 15, *Mahmood v. Research in Motion Ltd.*, Case 1:11-cv-05345-KBF, Filed Nov. 17, 2011, 14 Pgs.
United States District Court Southern District of New York, Plaintiff's Response to Defendant's Letter Submission, Document 29, *Mahmood v. Research in Motion Ltd.*, Case 1:11-cv-05345-KBf, Filed Dec. 28, 2011, 7 Pgs.
United States District Court Southern District of New York, Memorandum Opinion and Order, Document 35, *Mahmood v. Research in Motion Ltd.*, Case 1:11-cv-05345-KBF, Filed Jan. 24, 2012, 24 Pgs.
United States District Court Southern District of New York, Plaintiff's Opposition to Defendant's Second Motion for Summary Judgment, Document 45, *Mahmood v. Research in Motion Ltd.*, Case 1:11-cv-05345-KBF, Filed Mar. 2, 2012, 29 Pgs.
United States District Court Southern District of New York, Complaint, Document 1, *Mahmood v. Research in Motion Ltd.*, Case 1:12-cv-00899-KBF, Filed Feb. 3, 2012, 416 Pgs.
United States District Court Southern District of New York, Opinion and Order of the Court, Document 71, *Mahmood v. Research in Motion Ltd.*, Case 1:11-cv-05345-KBF, Filed May 16, 2012, 20 pgs.
USPTO, Office Action, U.S. Appl. No. 09/783,726, Apr. 13, 2012, 12 pgs.
USPTO, Advisory Action, U.S. Appl. No. 09/783,726, Jun. 4, 2012, 3 pgs.
EPO, Result of Consultation, Application No. 03003769.1, Aug. 23, 2012, 3 pgs.
USPTO, Examiner's Answer, U.S. Appl. No. 09/783,726, Jul. 18, 2012, 15 pgs.
USPTO, Notice of Panel Decision from Pre-Appeal Brief Review, U.S. Appl. No. 09/783,726, Jul. 18, 2012, 2 pgs.
EPO, Communication pursuant to Article 94(3) EPC, Application No. 03003769.1, Apr. 17, 2012, 6 Pgs.
CIPO, Office Action, Application No. 2,511,594, Dec. 27, 2012, 3 pgs.
EPO, Intention to Grant, Application No. 03003769.1, Oct. 10, 2012, 7 pgs.
USPTO, Decision on Appeal, U.S. Appl. No. 09/783,726, Dec. 10, 2012, 12 pgs.
United States District Court Southern District of New York, Opinion and Order, Document 22, *Mahmood v. Research in Motion Ltd.*, Case 1:12-cv-00899-KBF, Filed Oct. 25, 2012, 15 Pgs.
USPTO, Office Action, U.S. Appl. No. 09/783,726, Feb. 20, 2013, 6 pgs.
USPTO, Final Office Action, U.S. Appl. No. 09/783,726, May 29, 2013, 14 pgs.

\* cited by examiner

SYSTEM AND METHOD FOR PUSHING INFORMATION FROM A HOST SYSTEM TO A MOBILE COMMUNICATION DEVICE

This application is a continuation of U.S. Ser. No. 09/528,495, filed on Mar. 17, 2000, now U.S. Pat. No. 6,463,464, which is a divisional of U.S. Ser. No. 09/087,623, filed May 29, 1998, now U.S. Pat. No. 6,219,694.

BACKGROUND OF THE INVENTION

The present invention is directed toward the field of replicating information from a host system where the information is normally stored to a mobile data communication device. In particular, the system and method of the present invention provide an event-driven redirection computer program ("redirector program") operating at the host system, which, upon sensing a particular user-defined event has occurred, redirects user-selected data items from the host system to the user's mobile data communication device. The mobile data communication device is preferably coupled to the host system via a wireless network and one or more landline networks. Due to the bandwidth limitations of wireless networks, only a portion of a user-selected data item is generally redirected to the user's mobile device, with the user given the option of then retrieving the entire data item (or some other portion of the data item) from the host system.

Instead of warehousing (or storing) the user's data items at the host system and then "synchronizing" the mobile data communication device to data items stored at the host system when the mobile device requests that such items of information be communicated to it, the present invention employs a "push" paradigm that continuously packages and retransmits the user-selected items of information to the mobile data communication device in response to a triggering event detected at the host system. Wireless mobile data communications devices, especially those that can return a confirmation signal to the host that the pushed data has been received are especially well suited for this type of push paradigm.

Present systems and methods for replicating information from a host system to a user's mobile data communication device are typically "synchronization" systems in which the user's data items are warehoused (or stored) at the host system for an indefinite period of time and then transmitted in bulk only in response to a user request. In these types of systems and methods, when replication of the warehoused data items to the mobile device is desired, the user typically places the mobile device in an interface cradle that is electrically connected to the host system via some form of local, dedicated communication, such as a serial cable or an infrared or other type of wireless link. Software executing on the mobile data communication device then transmits commands via the local communications link to the host system to cause the host to begin transmitting the user's data items for storage in a memory bank of the mobile device. In these synchronization schemes, the mobile unit "pulls" the warehoused information from the host system in a batch each time the user desires to replicate information between the two devices. Therefore, the two systems (host and mobile) only maintain the same data items after a user-initiated command sequence that causes the mobile device to download the data items from the host system. A general problem with these synchronization systems is that the only time that the user data items are replicated between the host system and the mobile data communication device is when the user commands the mobile device to download or pull the user data from the host system. Five minutes later a new message could be sent to the user, but the user would not receive that message until the next time the user fetches the user data items. Thus, a user may fail to respond to an emergency update or message because the user only periodically synchronizes the system, such as once per day. Other problems with these systems include: (1) the amount of data to be reconciled between the host and the mobile device can become large if the user does not "synchronize" on a daily or hourly basis, leading to bandwidth difficulties, particularly when the mobile device is communicating via a wireless packet-switched network; and (2) reconciling large of data, as can accrue in these batch-mode synchronization systems, can require a great deal of communication between the host and the mobile device, thus leading to a more complex, costly and energy-inefficient system. A more automated, continuous, efficient and reliable system of ensuring that user data items are replicated at the user's mobile device is therefore needed.

An additional feature of the present invention is that the push paradigm, in combination with a return communications pathway, lends itself well to a system that permits a user to control remotely, through the user's mobile device, a number of aspects of the host system.

There remains a general need in this art for a system and method of continuously pushing user-selected data items (or certain portions of the selected data items) stored at a host system to a user's mobile data communication device.

There remains a more particular need for such a system and method where user-selected data items are continuously "pushed" from the host system to the mobile data communication device upon the occurrence of one or more user-defined triggering events.

There remains an additional need for such a system and method that provides flexibility in the types and quantities of user data items that are pushed from the host system to the mobile data communication device and that also provides flexibility in the configuration and types of events that can serve to trigger the redirection of the user data items.

There remains yet an additional need for such a system and method that can operate locally on a user's desktop PC or at a distance via a network server.

There remains still another need for such a system and method that provides for secure, transparent delivery of the user-selected data items from the host system to the mobile device.

SUMMARY OF THE INVENTION

The present invention overcomes the problems noted above and satisfies the needs in this field for a system and method of pushing user-selected data items from a host system to a user's mobile data communication device upon detecting the occurrence of one or more user-defined event triggers. As used in this application, the term host system refers to the computer where the redirector software is operating. In the preferred embodiment of the present invention, the host system is a user's desktop PC, although, alternatively, the host system could be a network server connected to the user's PC via a local-area network ("LAN)", or could be any other system that is in communication with the user's desktop PC.

A redirector program operating at the host system enables the user to redirect or mirror certain user-selected data items (or parts of data items) from the host system to the user's mobile data communication device upon detecting that one or more user-defined triggering events has occurred. Also operating at the host system are various sub-systems that can be configured to create triggering events, such as a screen saver sub-system or a keyboard sub-system, as well as sub-systems for repackaging the user's data items for transparent delivery to the mobile data device, such as a TCP/IP sub-system or one or more E-Mail sub-systems. Other sub-systems for creating triggering events and repackaging the user's data items could also be present at the host system. The host system also includes a primary memory store where the user's data items are normally stored.

Using the redirector program, the user can select certain data items for redirection, such as E-mail messages, calendar events, meeting notifications, address entries, journal entries, personal reminders etc. Having selected the data items for redirection, the user can then configure one or more event triggers to be sensed by the redirector program to initiate redirection of the user data items. These user-defined trigger points (or event triggers) include external events, internal events and networked events. Examples of external events include: receiving a message from the user's mobile data communication device to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the examples of the types of user-defined events that can trigger the redirector program to push data items from the host to the mobile device. Although in the preferred embodiment it is anticipated that the configuration that specifies which data items will be redirected and in what form will be set at the host system, it is within the scope of this invention that such configuration may be set or modified through data sent from the mobile communications device.

In addition to the functionality noted above, the redirector program provides a set of software-implemented control functions for determining the type of mobile data communication device and its address, for programming a preferred list of message types that are to be redirected, and for determining whether the mobile device can receive and process certain types of message attachments, such as word processor or voice attachments. The determination of whether a particular mobile device can receive and process attachments is initially configured by the user of that mobile device at the host system. This configuration can be altered on a global or per message basis by transmitting a command message from the mobile device to the host system. If the redirector is configured so that the mobile data device cannot receive and process word processor or voice attachments, then the redirector routes these attachments to an external machine that is compatible with the particular attachment, such as an attached printer or networked fax machine or telephone. Other types of attachments could be redirected to other types of external machines in a similar fashion, depending upon the capabilities of the mobile device. For example, if a user is traveling and receives a message with an attachment that the user's mobile device can process or display, the user may from a mobile communications device send a command message to the host system indicating that that attachment is to be sent to a fax machine at a hotel where the user will be spending the evening. This enables the user to receive important E-mail attachments as long as the host system is provided with sufficient information about the destination where the attachment is to be forwarded.

Once an event has triggered redirection of the user data items, the host system then repackages these items in a manner that is transparent to the mobile data communication device, so that information on the mobile device appears similar to information on the user's host system. The preferred repackaging method includes wrapping the user data items in an E-mail envelope that corresponds to the address of the mobile data communication device, although, alternatively, other repackaging methods could be used with the present invention, such as special-purpose TCP/IP wrapping techniques, or other methods of wrapping the user selected data items. The repackaging preferably results in E-mail messages generated by the user from the mobile device to be transmitted from the host system, thus enabling the user to appear to have a single E-mail address, such that the recipients of messages sent from the mobile communications device do not know where the user was physically located when the message was first sent. The repackaging also permits both messages to the mobile device and sent from the mobile device to be encrypted and decrypted as well as compressed and decompressed.

In an alternative system and method, the redirector program executes on a network server, and the server is programmed to detect numerous redirection event triggers over the network from multiple user desktop computers coupled to the server via a LAN. The server can receive internal event triggers from each of the user desk-tops via the network, and can also receive external event triggers, such as messages from the users' mobile data communication devices. In response to receiving one of these triggers, the server redirects the user's data items to the proper mobile data communication device. The user data items and addressing information for a particular mobile device can be stored at the server or at the user's PC. Using this alternative configuration, one redirector program can serve a plurality of users. This alternative configuration could also include an internet or intranet-based redirector program that could be accessible through a secure webpage or other user interface. The redirector program could be located on an Internet Service Provider's system and accessible only through the Internet.

In another alternative configuration of the present invention, a redirector program operates at both the host system and at the user's mobile data communication device. In this configuration, the user's mobile device operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host.

The primary advantage of the present invention is that it provides a system and method for triggering the continuous and real-time redirection of user-selected data items from a host system to a mobile data communication device. Other advantages of the present invention include: (1) flexibility in defining the types of user data to redirect, and in defining a preferred list of message types that are to be redirected or preferred senders whose messages are to be redirected; (2) flexibility in configuring the system to respond to numerous internal, external and networked triggering events; (3) transparent repackaging of the user data items in a variety of ways such that the mobile data communication device appears as though it were the host system; (4) integration with other host system components such as E-mail, TCP/IP, keyboard, screen saver, webpages and certain programs that can either create user data items or be configured to provide trigger points; and (5) the ability to operate locally on a user's desktop system or at a distance via a network server.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
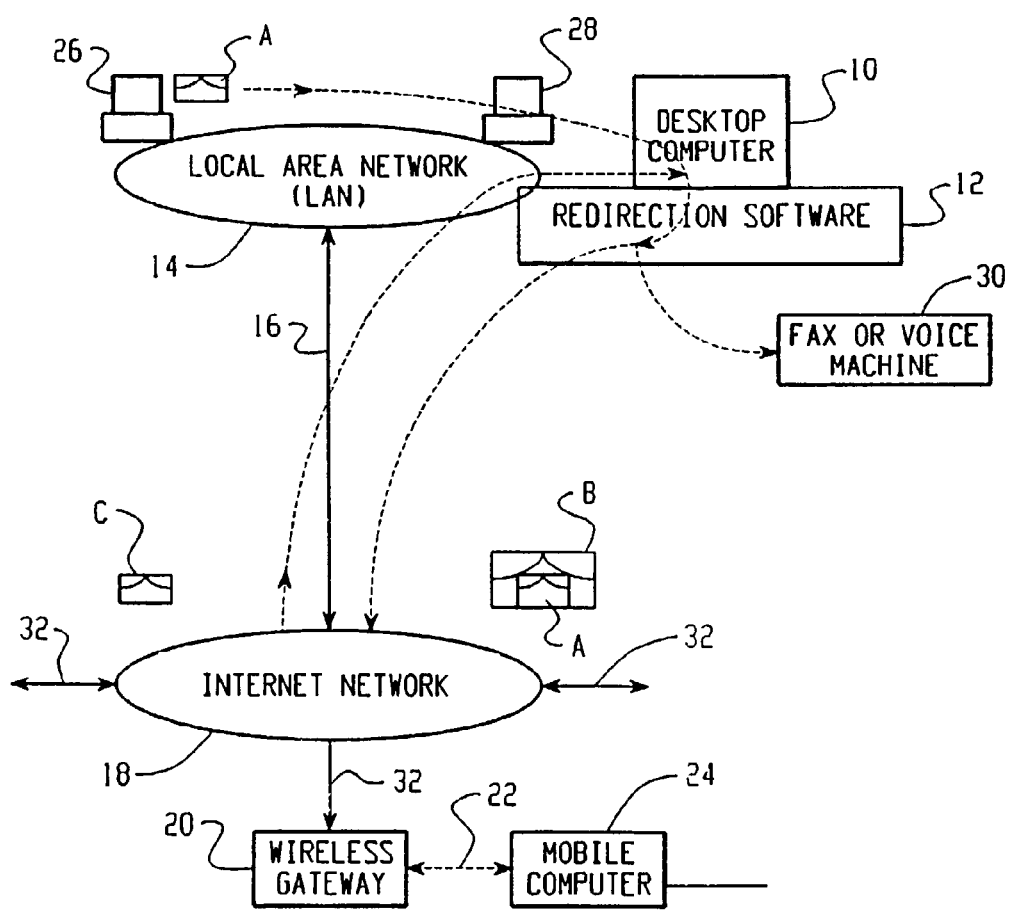
FIG. 1 is a system diagram showing the redirection of user data items from a user's desktop PC (host system) to the user's mobile data communication device, where the redirector software is operating at the user's desktop PC.

Referring now to the drawings, FIG. 1 is an example system diagram showing the redirection of user data items (such as message A or C) from a user's office PC (host system) 10 to the user's mobile data communication device 24, where the redirector software 12 is operating at the user's PC, at which the redirector software is stored in a non-transitory computer readable medium. Message A in FIG. 1 represents an internal message sent from desktop 26 to the user's host system 10 via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10. As described in more detail in FIG. 3, the host system 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46.

In FIG. 1, the host system 10 is the user's desktop system, typically located in the user's office. The host system 10 is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively could be any other type of WAN. The connection of the LAN 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices 24. Also shown in FIG. 1 is machine 30, which could be a FAX machine, a printer, a system for displaying images (such as video) or a machine capable of processing and playing audio files, such as a voice mail system. The present invention includes the ability to redirect certain message attachments to such an external machine 30 if the redirector program configuration data reflects that the mobile device 24 cannot receive and process the attachments, or if the user has specified that certain attachments are not to be forwarded to mobile device 24, even if such device can process those attachments. By way of example, consider an E-mail sent to a user that includes three attachments—a word processing document, a video clip and an audio clip. The redirection program could be configured to send the text of the E-mail to the remote device, to send the word processing document to a networked printer located near the user, to send the video clip to a store accessible through a secure connection through the internet and to send the audio clip to the user's voice mail system. This example is not intended to limit the breadth and scope of the invention, but rather to illustrate the variety of possibilities embodied in the redirection concept.

Figure 4:
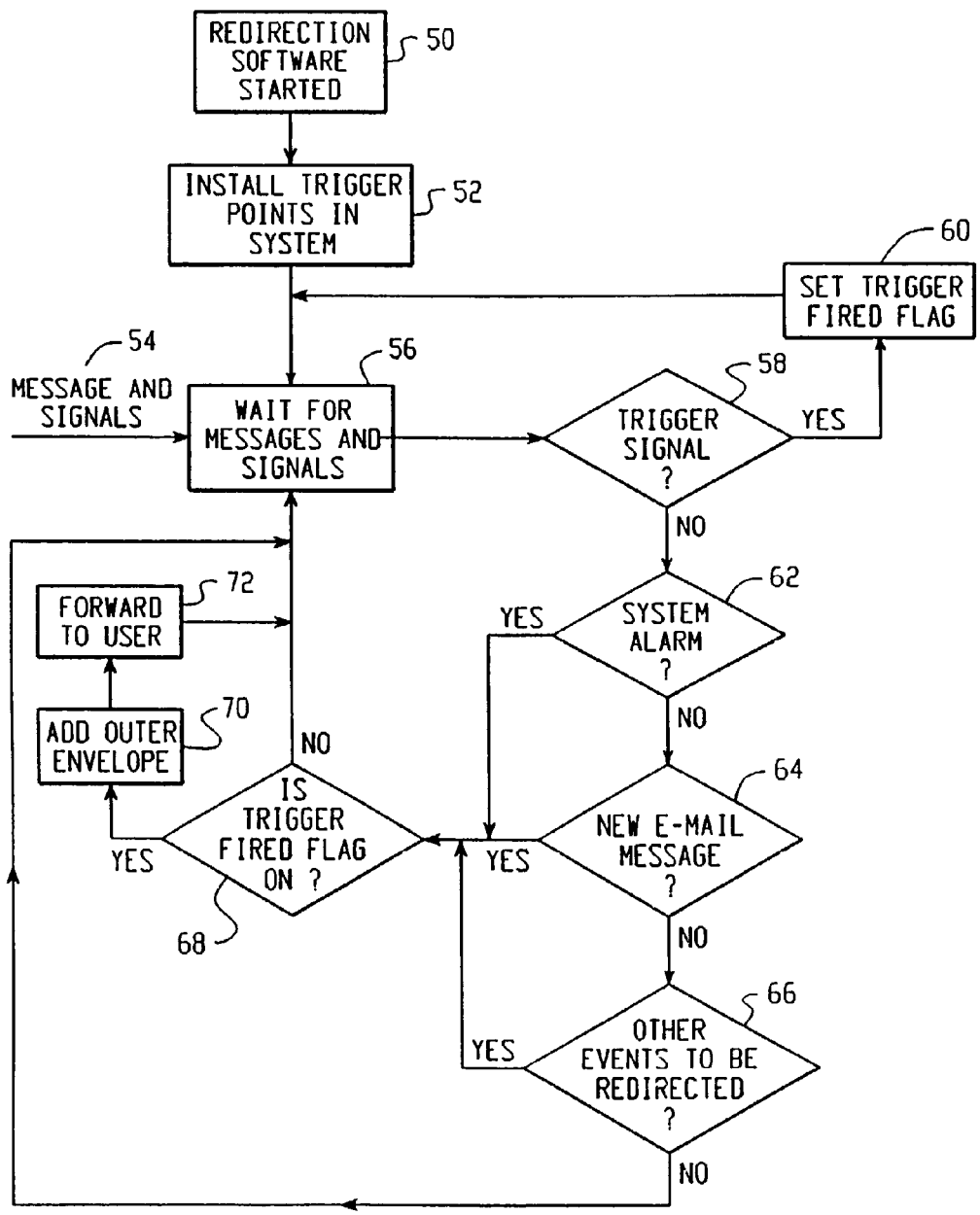
FIG. 4 is a flow chart showing the steps carried out by the redirector software operating at the host system.

The preferred mobile data communication device 24 is a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although it is preferable for the system to operate in a two-way communications mode, certain aspects of the invention could be beneficially used in a "one and one-half" or acknowledgment paging environment, or even with a one-way paging system. The mobile data communication device 24 includes software program instructions stored in suitable non-transitory computer readable media that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

In an alternative embodiment of the present invention, not explicitly shown in the drawings, the mobile device 24 also includes a redirector program stored in a non-transitory computer readable medium. In this embodiment, user selected data items can be replicated from the host to the mobile device and vice versa. The configuration and operation of the mobile device having a redirector program is similar to that described herein with respect to FIGS. 1-4.

A user of the present invention can configure the redirector program 12 to push certain user-selected data items to the user's mobile data communication device 24 when the redirector 12 detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

Among the user-defined event triggers that can be detected by the redirector program 12 are in the preferred embodiment external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used with the present invention to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from the user's mobile device 24). Once the message A (or C) reaches the primary message store of the host system 10, it can be detected and acted upon by the redirection software 12. The redirection software 12 can use many methods of detecting new messages. The preferred method of detecting new messages is using Microsoft's® Messaging API (MAPI), in which programs, such as the redirector program 12, register for notifications or advise syncs' when changes to a mailbox take place. Other methods of detecting new messages could also be used with the present invention.

Assuming that the redirector program 12 is activated, and has been configured by the user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24. In preparing the message for redirection, the redirector program 12 could compress the original message A, could compress the message header, or could encrypt the entire message A to create a secure link to the mobile device 24.

Also programmed into the redirector 12 is the address of the user's mobile data communication device 24, the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30.

The redirector may also be programmed with a preferred list mode that is configured by the user either at the host system 10, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can then send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the software 12 then sends the message A to a secondary memory store located in the mobile device 24, using whatever means are necessary. In the preferred embodiment this method is to send the message A back over the LAN 14, WAN 18, and through the wireless gateway 20 to the mobile data communication device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. By repackaging and removing the outer envelope in this manner, the present invention causes the mobile computer 24 to appear to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, the command message C is not redirected, but is acted upon by the host system 10.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. In the preferred embodiment, this results in the outgoing redirected message from the user's host system 10 being sent using the E-mail address of the host mailbox, rather than the address of the mobile device, so that it appears to the recipient of the message that the message originated from the user's desktop system 10 rather than the mobile data communication device. Any replies to the redirected message will then be sent to the desktop system 10, which if it is still in redirector mode, will repackage the reply and resend it to the user's mobile data device, as described above.

Figure 2:
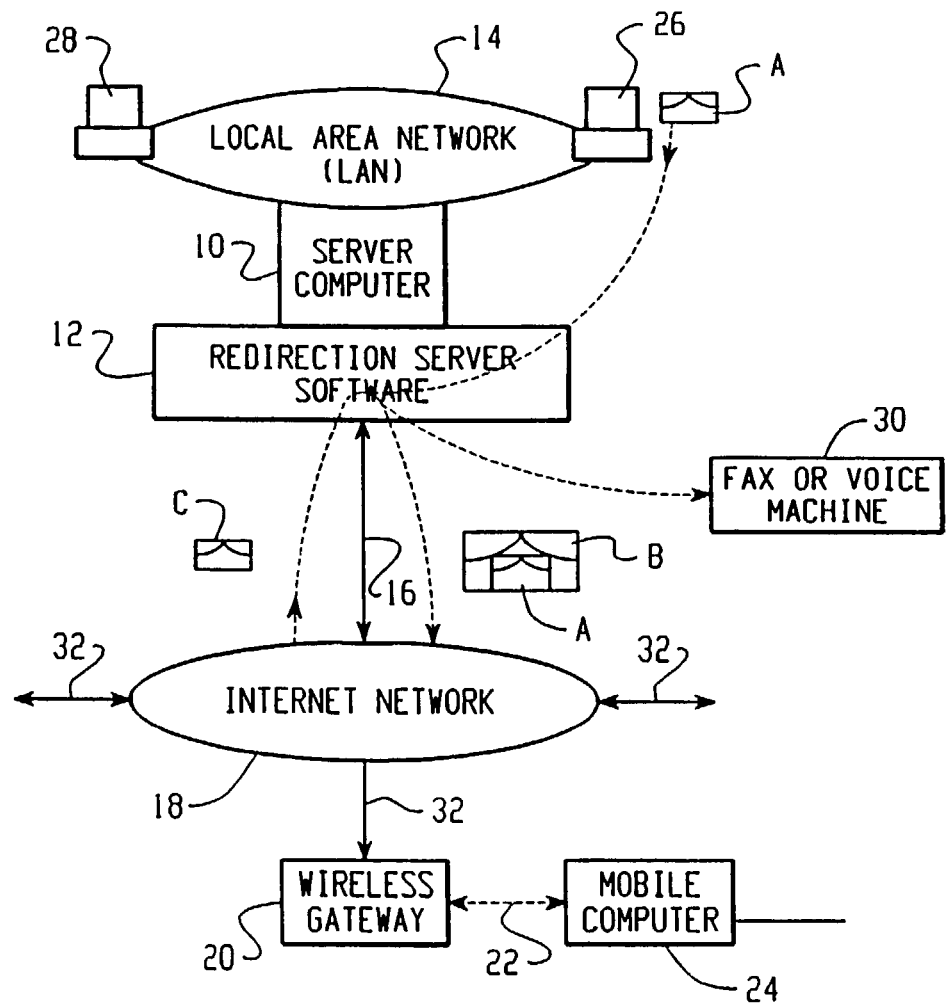
FIG. 2 is a system diagram showing the redirection of user data items from a network server (host system) to the user's mobile data communication device, where the redirector software is operating at the server.

FIG. 2 is an alternative system diagram showing the redirection of user data items from a network server 11 to the user's mobile data communication device 24, where the redirector software 12 is operating at the server 11, at which the redirector software is stored in a non-transitory computer readable medium. This configuration is particularly advantageous for use with message servers such as Microsoft's® Exchange Server, which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 11 preferably maintains a user profile for each user's desktop system 10, 26, 28, including information such as whether a particular user can have data items redirected, which types of message and information to redirect, what events will trigger redirection, the address of the users' mobile data communication device 24, the type of mobile device, and the user's preferred list, if any. The event triggers are preferably detected at the user's desktop system 10, 26, 28 and can be any of the external, internal or network events listed above. The desktop systems 10, 26, 28 preferably detect these events and then transmit a message to the server computer 11 via LAN 14 to initiate redirection. Although the user data items are preferably stored at the server computer 11 in this embodiment, they could, alternatively, be stored at each user's desktop system 10, 26, 28, which would then transmit them to the server computer 11 after an event has triggered redirection.

As shown in FIG. 2, desktop system 26 generates a message A that is transmitted to and stored at the host system 11, which is the network server operating the redirector program 12. The message A is for desktop system 10, but in this embodiment, user messages are stored at the network server 11. When an event occurs at desktop system 10, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 10.

As described above with reference to FIG. 1, message C could be either a command message from a user's mobile data communication device 24, or it could be a message from an external computer, such as a computer connected to the Internet 18. If the message C is from an Internet computer to the user's desktop system 10, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
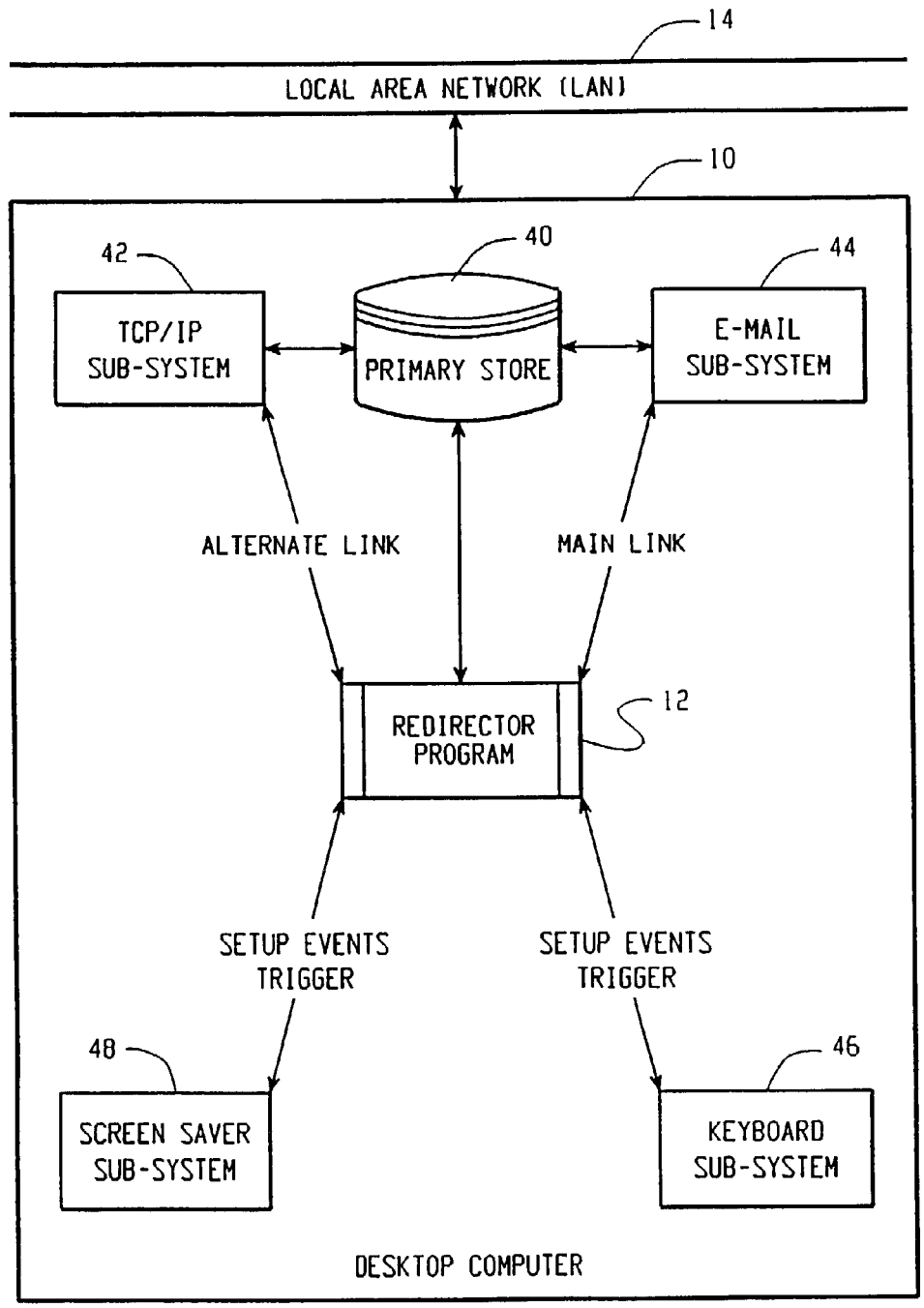
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram showing the interaction of the redirector software 12 with additional components of the host system 10 of FIG. 1 (the desktop PC) to enable more fully the pushing of information from the host system 10 to the user's mobile data communication device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10 includes the redirector program 12, a TCP IP sub-system 42, an E-mail sub-system 44, a primary data storage device 40, a screen saver sub-system 48, and a keyboard sub-system 46, wherein the software programs are stored in suitable non-transitory computer readable media. The TCP IP and E-mail sub-systems 42, 44 are examples of repackaging systems that can be used to achieve the transparency of the present invention, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile data communication device; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile device 24, and the original message A (or C) is then recovered, thus making the mobile device 24 appear to be the desktop system 10.

In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-system also receives command messages C from the mobile device 24 that are directed to the desktop system 10 to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and real-time delivery.

As described previously, the present invention can be triggered to begin redirection upon detecting numerous external, internal and networked events, or trigger points. Examples of external events include: receiving a command message from the user's mobile data communication device 24 to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start the redirection process. For example, the screen saver system can be configured so that when the screen saver is activated, after, for example, 10 minutes of inactivity on the desktop system, an event trigger is transmitted to the redirector 12, which starts redirecting the previously selected user data items. In a similar manner the keyboard sub-system can be configured to generate event triggers when no key has been depressed for a particular period of time, thus indicating that redirection should commence. These are just two examples of the numerous application programs and hardware systems internal to the host system 10 that can be used to generate internal event triggers.

Figure 5:
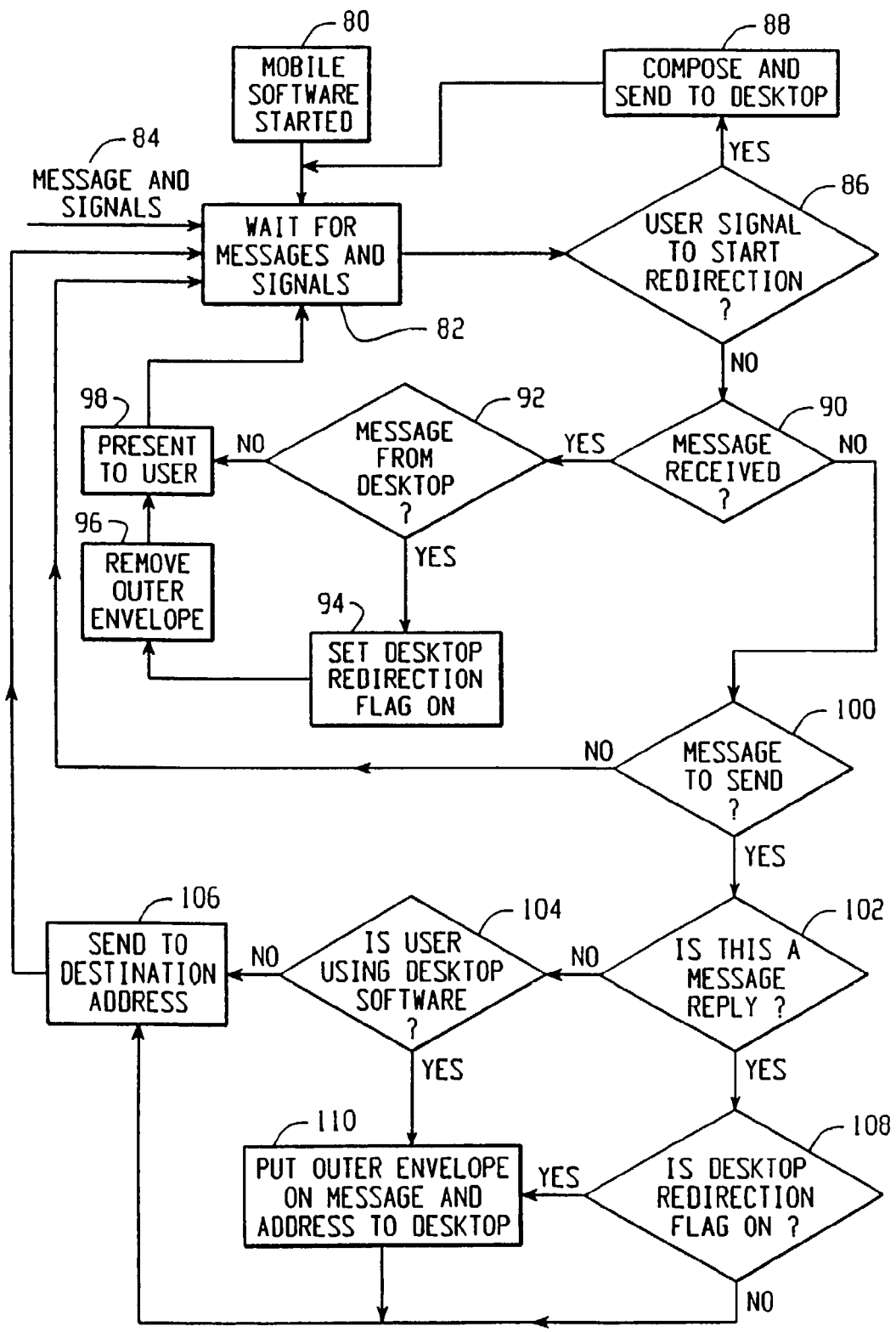
FIG. 5 is a flow chart showing the steps carried out by the mobile data communication device to interface with the redirector software operating at the host system.

FIGS. 4 and 5, set forth, respectively, flow charts showing the steps carried out by the redirector software 12 operating at the host system 10, and the steps carried out by the mobile data communication device 24 in order to interface with the host system. Turning first to FIG. 4, at step 50, the redirector program 12 is started and initially configured. The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device; and (5) configuring the preferred list of user selected senders whose messages are to be redirected.

FIG. 4 sets forth the basic steps of the redirector program 12 assuming it is operating at a desktop system 10, such as shown in FIG. 1. If the redirector 12 is operating at a network server 11, as shown in FIG. 2, then additional configuration steps may be necessary to enable redirection for a particular desktop system 10, 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile device.

Once the redirector program is configured 50, the trigger points (or event triggers) are enabled at step 52. The program 12 then waits 56 for messages and signals 54 to begin the redirection process. A message could be an E-Mail message or some other user data item than may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile data communication device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device. If the trigger flag is set, then at step 70, the redirector 12 causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender was on the preferred list, then control would similarly pass to steps 70 and 72 for repackaging and transmission of the message from the preferred list sender.

FIG. 5 sets forth the method steps carried out by the user's mobile data communication device 24 in order to interface to the redirector program 12 of the present invention. At step 80 the mobile software is started and the mobile device 24 is configured to operate with the system of the present invention, including, for example, storing the address of the user's desktop system 10.

At step 82, the mobile device waits for messages and signals 84 to be generated or received. Assuming that the redirector software 12 operating at the user's desktop system 10 is configured to redirect upon receiving a message from the user's mobile device 24, at step 86, the user can decide to generate a command message that will start redirection. If the user does so, then at step 88 the redirection message is composed and sent to the desktop system 10 via the wireless network 22, through the wireless gateway 20, via the Internet 18 to the LAN 14, and is finally routed to the desktop machine 10. In this situation where the mobile device 24 is sending a message directly to the desktop system 10, no outer wrapper is added to the message (such as message C in FIGS. 1 and 2).

In addition to the redirection signal, the mobile device 24 could transmit any number of other commands to control the operation of the host system, and in particular the redirector program 12. For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include: (1) a message to change the configuration of the host system to enable the mobile device 24 to receive and process certain attachments; and (2) a message to instruct the host system to redirect an entire data item to the mobile device in the situation where only a portion of a particular data item has been redirected.

Turning back to FIG. 5, if the user signal or message is not a direct message to the desktop system 10 to begin redirection (or some other command), then control is passed to step 90, which determines if a message has been received. If a message is received by the mobile, and it is a message from the user's desktop 10, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If, however, the redirection flag is on, then at step 110 the reply message is repackaged with the outer envelope having the addressing information of the user's desktop system 10, and the repackaged message is then transmitted to the desktop system 10 at step 106. As described above, the redirector program 12 executing at the desktop system then strips the outer envelope and routes the reply message to the appropriate destination address using the address of the desktop system as the "from" field, so that to the recipient of the redirected message, it appears as though it originated from the user's desktop system rather than the mobile data communication device.

If, at step 102, the mobile determines that the message is not a reply message, but an original message, then control passes to step 104, where the mobile determines if the user is using the redirector software 12 at the desktop system 10, by checking the mobile unit's configuration. If the user is not using the redirector software 12, then the message is simply transmitted to the destination address at step 106. If, however, the mobile determines that the user is using the redirector software 12 at the desktop system 10, then control passes to step 110, where the outer envelope is added to the message. The repackaged original message is then transmitted to the desktop system 10 at step 106, which, as described previously, strips the outer envelope and routes the message to the correct destination. Following transmission of the message at step 106, control of the mobile returns to step 82 and waits for additional messages or signals.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed:

1. A method of replicating data items to a mobile data communication device of a user, the method comprising:
    receiving an automatically generated notification at a redirector host system that is disposed in a local area network and coupled to a message server associated with the user, wherein the automatically generated notification is indicative of arrival of a data item in a mailbox of the user at the message server; and
    responsive to receipt of the automatically generated notification, processing the data item by the redirector host system to create a processed data item and causing to push the processed data item to the mobile data communication device of the user over a wide area data network coupled to a wireless gateway, wherein the data item is wrapped in an email that corresponds to an address of the mobile data communication device.

2. The method as recited in claim 1 further comprising determining a network address of the mobile data communication device of the user.

3. The method as recited in claim 1 wherein the processing further comprises encrypting the data item.

4. The method as recited in claim 3 further comprising establishing a secure link to the mobile data communication device.

5. The method as recited in claim 1 wherein the processing further comprises compressing the data item.

6. The method as recited in claim 1 wherein the processing further comprises encoding the data item.

7. The method as recited in claim 1 wherein the processing further comprises using Multipurpose Internet Mail Extensions (MIME).

8. The method as recited in claim 1 further comprising filtering the received data item using at least one message filter selected from a preferred list, sender of the data item, type of the mobile data communication device, address of the mobile data communication device, user selectable criteria and characteristics of the data item.

9. The method as recited in claim 1 further comprising determining whether the data item includes an attachment, if so then determining the type of attachment and determining the types of attachments that the mobile data communication device can receive and process.

10. The method as recited in claim 9 further comprising sending the data item without the attachment.

11. The method as recited in claim 1 further comprising storing the data item in a data store associated with the message server.

12. The method as recited in claim 1 wherein the mobile data communication device is one of a hand-held wireless paging computer, a wireless-enabled palm-top computer, a mobile telephone with data messaging capabilities and a wireless-enabled laptop computer.

13. The method as recited in claim 1 wherein pushing the data item to the mobile data communication device of the user further comprises sending a first portion of the data item to the mobile data communication device of the user and sending at least one additional portion of the data item to the mobile data communication device of the user responsive to a request from the mobile data communication device for the at least one additional portion.

14. A non-transitory computer readable storage medium with software instructions which, when executed by a processing entity, effectuate replicating of data items to a mobile data communication device of a user, the non-transitory computer readable medium comprising:

a code portion configured to process an automatically generated notification received via a local area network coupled to a message server associated with the user, wherein the automatically generated notification is indicative of arrival of a data item in a mailbox of the user at the message server; and a code portion, configured to operate responsive to the received automatically generated notification, for processing the data item to create a processed data item and for causing to push the processed data item to the mobile data communication device of the user over a wide area data network coupled to a wireless gateway, wherein the data item is wrapped in an email that corresponds to an address of the mobile data communication device.

15. The non-transitory computer readable storage medium as recited in claim 14 further comprising a code portion configured for determining a network address of the mobile data communication device of the user.

16. The non-transitory computer readable storage medium as recited in claim 14 wherein the processing further comprises encrypting the data item.

17. The non-transitory computer readable storage medium as recited in claim 16 further comprising a code portion configured for establishing a secure link to the mobile data communication device.

18. The non-transitory computer readable storage medium as recited in claim 14 wherein the processing further comprises compressing the data item.

19. The non-transitory computer readable storage medium as recited in claim 14 wherein the processing further comprises encoding the data item.

20. The non-transitory computer readable storage medium as recited in claim 14 wherein the processing further comprises using Multipurpose Internet Mail Extensions (MIME).

21. The non-transitory computer readable storage medium as recited in claim 14 further comprising a code portion configured for filtering the received data item using at least one message filter.

22. The non-transitory computer readable storage medium as recited in claim 21 wherein the at least one message filter is selected from a preferred list, sender of the data item, type of the mobile data communication device, address of the mobile data communication device, user selectable criteria and characteristics of the data item.

23. The non-transitory computer readable storage medium as recited in claim 14 further comprising a code portion configured for determining whether the data item includes an attachment, if so then determining the type of attachment and determining the types of attachments that the mobile data communication device can receive and process.

24. The non-transitory computer readable storage medium as recited in claim 23 further comprising a code portion configured for sending the data item without the attachment.

25. The non-transitory computer readable storage medium as recited in claim 14 further comprising a code portion configured for storing the data item in a data store associated with the message server.

26. The non-transitory computer readable storage medium as recited in claim 14 wherein the mobile data communication device is one of a hand-held wireless paging computer, a wireless-enabled palm-top computer, a mobile telephone with data messaging capabilities and a wireless-enabled laptop computer.

27. The non-transitory computer readable storage medium as recited in claim 14 further comprising a code portion configured for sending a first portion of the data item to the mobile data communication device of the user and sending at least one additional portion of the data item to the mobile data communication device of the user responsive to a request from the mobile data communication device for the at least one additional portion.

* * * * *

UNITED STATES PATENT AND TRADEMARK OFFICE
CERTIFICATE OF CORRECTION

PATENT NO. : 9,344,839 B2  
APPLICATION NO. : 10/207418  
DATED : May 17, 2016  
INVENTOR(S) : Mihal Lazaridis and Gary P. Mousseau It is certified that error appears in the above-identified patent and that said Letters Patent is hereby corrected as shown below:

On the title page item (54), and in the specification, column 1, line 3, After "MOBILE" insert -- DATA --.

Signed and Sealed this
Twenty-sixth Day of July, 2016

Michelle K. Lee
*Director of the United States Patent and Trademark Office*